(12) United States Patent
Beshai

(10) Patent No.: US 7,684,389 B2
(45) Date of Patent: *Mar. 23, 2010

(54) MULTI-DIMENSIONAL LATTICE NETWORK

(75) Inventor: Maged E. Beshai, Stittsville (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 1030 days.

This patent is subject to a terminal disclaimer.

(21) Appl. No.: 10/969,748

(22) Filed: Oct. 20, 2004

(65) Prior Publication Data

US 2005/0068946 A1 Mar. 31, 2005

Related U.S. Application Data

(63) Continuation of application No. 09/624,079, filed on Jul. 24, 2000, now Pat. No. 6,853,635.

(51) Int. Cl.
*H04Q 11/00* (2006.01)
(52) U.S. Cl. .................... 370/387; 370/254; 370/388
(58) Field of Classification Search .............. 370/254, 370/255, 352–359, 387–389, 360, 361, 395.1, 370/395.32, 395.52, 400; 385/17; 398/41–58; 712/11–15; 709/238–244
See application file for complete search history.

(56) References Cited

U.S. PATENT DOCUMENTS

| | | | | |
|---|---|---|---|---|
| 4,038,497 A * | 7/1977 | Collins et al. | ............... | 370/361 |
| 5,157,654 A * | 10/1992 | Cisneros | .................... | 370/414 |
| 5,175,733 A * | 12/1992 | Nugent | ....................... | 370/400 |
| 5,745,486 A * | 4/1998 | Beshai et al. | .......... | 370/395.71 |
| 6,330,242 B1 * | 12/2001 | Ogawa et al. | .......... | 370/395.52 |
| 6,483,808 B1 * | 11/2002 | Rochberger et al. | ......... | 370/238 |
| 6,486,983 B1 * | 11/2002 | Beshai et al. | ................. | 398/54 |
| 6,570,874 B1 * | 5/2003 | Nakai et al. | ................. | 370/387 |
| 6,606,427 B1 * | 8/2003 | Graves et al. | .................. | 385/17 |
| 6,639,897 B1 * | 10/2003 | Shiomoto et al. | ........... | 370/238 |
| 6,853,635 B1 * | 2/2005 | Beshai | ....................... | 370/351 |
| 6,876,649 B1 * | 4/2005 | Beshai | ....................... | 370/355 |
| 6,920,131 B2 * | 7/2005 | Beshai | ....................... | 370/380 |
| 7,200,340 B2 * | 4/2007 | Beshai et al. | ............... | 398/140 |
| 2004/0114539 A1 * | 6/2004 | Beshai et al. | ............... | 370/254 |
| 2004/0208625 A1 * | 10/2004 | Beshai et al. | ............... | 398/161 |
| 2007/0147362 A1 * | 6/2007 | Beshai et al. | ............... | 370/388 |

* cited by examiner

*Primary Examiner*—Ian N Moore
(74) *Attorney, Agent, or Firm*—Anderson Gorecki & Manaras LLP

(57) ABSTRACT

An N-dimensional lattice network that scales to capacities of the order of a Yotta bits per second ($10^{24}$ bits per second) includes a plurality of sub-nets of edge module switches interconnected by an agile switching core. The agile core may be distributed. In the N-dimensional lattice network, each edge module 408 is connected to N core stages, each core stage having an associated dimensional indicator. The input/output ports of each edge module are divided into (N+1) port groups. One of the port groups serves local sources/sinks while the remaining port groups are respectively connected to core stages in each of the N dimensions. This structure permits virtually unlimited capacity growth and significantly simplifies the routing and forwarding functions. The edge modules are addressed using logical coordinates, one coordinate being assigned for each of the N dimensions. This simplifies routing and permits each edge module to compute its own routing tables.

25 Claims, 19 Drawing Sheets

MULTI-DIMENSIONAL LATTICE NETWORK

RELATED APPLICATIONS

This application is a continuation application which claims priority under 35 U.S.C. §1.120 to previously filed application Ser. No. 09/624,079 filed Jul. 24, 2000, now issued as U.S. Pat. No. 6,853,635.

TECHNICAL FIELD

This invention relates generally to the field of the design and control of data networks. In particular, it is related to the architectural design and routing control in a very high-capacity data network adapted to provide service to a large geographical area.

BACKGROUND OF THE INVENTION

The architectural design of high-capacity data networks that provide quality of service is a challenging task that has inspired a great deal of inventive ingenuity. Network architectures which enable the construction of networks that scale to hundreds of Tera bits per second have been described in patent applications filed by the Applicant. For example, in U.S. patent application Ser. No. 09/286,431 (now issued as U.S. Pat. No. 6,570,872), filed on Apr. 6, 1999 and entitled SELF-CONFIGURING DISTRIBUTED SWITCH, a network architecture is described in which a plurality of high-capacity electronic edge modules are interconnected by an agile wavelength-switching optical core. U.S. patent application Ser. No. 09/475,139 (now issued as U.S. Pat. No. 6,486,983), filed on Dec. 30, 1999 and entitled AGILE OPTICAL-CORE DISTRIBUTED PACKET SWITCH, describes an architecture for an optical-core network in which the optical switching latency is masked. In U.S. patent application Ser. No. 09/550,489 (now issued as U.S. Pat. No. 6,876,649), filed Apr. 17, 2000 and entitled HIGH CAPACITY WDM-TDM PACKET SWITCH, a network architecture is described in which a plurality of electronic edge modules are interconnected by electronic space switches which are operated in a time division multiplexed (TDM) mode. The use of TDM permits a channel (typically a wavelength in a WDM transport medium) to be split into several sub-channels. This increases the number of edge modules that can be directly reached without a requirement for tandem switching.

Network architectures in Applicants' copending patent applications enable the construction of a network having edge control to satisfy quality-of-service requirements. Those networks can scale to about 1 Peta bits per second, i.e., $10^{15}$ bits per second. The number of edge modules in those networks is generally limited to about 1,000.

With the rapid growth of Internet traffic, and the potential for innovative applications that may require capacities that are orders of magnitude higher than current capacity requirements, a new approach to network design appears to be necessary. Backbone networks to support the potential expansion of the Internet require architectures adapted to support much wider coverage and higher capacity than the networks described to date. A global Internet can potentially include millions of edge modules with a combined user access capacity that approaches a Yotta bits per second ($10^{24}$ bits per second). One well-known method for constructing networks of that magnitude is to use a hierarchical structure where traffic streams from source nodes are aggregated into larger streams that are switched at coarse granularities in higher levels of the hierarchy.

The control complexity of hierarchical networks prompts a search for a different architecture. A multi-dimensional structure appears to be a promising approach. One of the well-known two-dimensional architectures is the so-called Manhattan-street network described in U.S. Pat. No. 4,797,882 which issued on Jan. 10, 1989 to Maxemchuk, entitled MESH-BASED SWITCHING NETWORK. Another example is U.S. Pat. No. 5,606,551 which issued on Feb. 25, 1997 to Kartalopoulos entitled BIDIRECTIONAL MESH NETWORK. Kartalopoulos describes a mesh network that is similar to the one described by Maxemchuk but uses intersecting bidirectional links.

A three-dimensional mesh network, known as a Torus network, in which each node can direct traffic to neighboring nodes along three dimensions is described in a paper by Banerjee et al. entitled "The Multi-Dimensional Torus: Analysis of Average Hop Distance and Application as a Multi-Hop Lightwave Network (IEEE, International Conference on Communications, 1994, pp. 1675-1680). The nodes in such networks are arranged in intersecting rings.

The mesh networks referred to above were designed to use bufferless nodes. Consequently, each node had to direct an incoming data unit to one of its neighboring nodes immediately upon arrival. The same architecture can be used with nodes capable of buffering incoming data units to resolve conflicting forwarding requirements. In either case, the mean number of hops from a source node to a sink node is proportional to the number of nodes in each of the rings. This dramatically reduces the efficiency of the network and limits its application to small-scale networks.

Another mesh architecture that uses intersecting buses is described in U.S. Pat. No. 5,499,239 which issued on Apr. 14, 1995 to Munter. Munter teaches a network architecture based on an implementation of a three-stage Clos network wherein each space-switching module is replaced by a bus. Each of the three stages is replaced by a set of parallel buses. The buses are interconnected by selectors for routing data between buses. This architecture has the same scalability limitations as a classical Clos network. It is, however, suitable for constructing a centralized switching node having a total capacity of several Tera bits per second.

Methods for constructing networks that scale virtually indefinitely are required to accommodate new specifications that may require capacities well beyond the Peta bits per second enabled by prior art network architectures. There therefore exists a need for a network architecture which enables the construction of a high-capacity network adapted to provide ensured quality-of-service over a very wide geographical area.

SUMMARY OF THE INVENTION

It is an object of the invention to provide an architecture for a data network that may be scaled to provide a high transfer capacity with a very large number of edge modules.

The invention therefore provides an N-dimensional lattice network that comprises a plurality of edge modules having respective identities. Each edge module is identified by N coordinates for addressing the edge module in the network. The edge modules are organized in a plurality of sub-nets, each sub-net including at least two edge modules having N–1 corresponding identical coordinates. Each of the edge modules in each sub-net is directly connected to N core stages for switching connections between edge module pairs. The number of edge modules in each sub-net is less than or equal to an upper-bound $Q_d$, $0 \leq d \leq N$.

The core stages may be a cross-connector or data packet switch, for example. Alternatively, the core stage may comprise a plurality of core switch modules. If so, the core modules may be geographically distributed. Regardless of whether the core switches are modular, the core may comprise agile switches that reconfigure to adapt to changing traffic loads in response to fluctuating traffic patterns. The core stage may also comprise a TDM space switch, and the TDM space switch may be an agile switch. Alternatively, the core stage may comprise an optical wavelength switch, and the optical wavelength switch may be an agile optical wavelength switch.

The invention further provides a method for computing route-sets for an edge module in a N-dimensional lattice network. The method comprises a first step of assigning a unique identity to each of the N dimensions of the network. The unique identities are then arranged in a starting order, and (N−1) of the unique identities are permuted to derive factorial (N−1) mutually exclusive routes. For routes to another edge module that has at least one coordinate which corresponds identically to coordinates of the edge module for which routes are being computed, the method further comprises a step of reducing the number of the unique identities permuted by one for each corresponding identical coordinate.

After the (N−1)! routes are generated, each of the routes is evaluated to determine a merit index associated with each of the routes. The evaluation is performed by rotating each permutation to produce a set of N rotations of each permutation. After the rotations are completed, another edge module in the network is selected and the coordinates of the other edge module are used to construct a set of N routes using the N rotations of each permutation. The merit of each of the N rotations of each permutation is then computed using some known merit measure, and the computed merit of each permutation is compared with the computed merit of the other permutations. The permutation with the greatest merit is selected, and the selected permutation is associated with the coordinates of the other edge module so that the rotations of the selected permutation are used as a route-set for setting up connections to the other edge module. Thereafter, connection setup messages are routed to the other edge module by selecting a one of the rotations and associating coordinates of the other module with respective ones of the unique identities using a connection array.

The N-dimensional lattice network in accordance with the invention is adapted to support high speed data transport over a large geographical area. In the network, a plurality of edge modules are connected to local data sources/sinks. Each edge module is identified by N coordinates that define a relative position of the edge modules in the N-dimensional lattice network. A plurality of the core stages switch data packets between the plurality of edge modules, each edge module being connected to N core stages. The edge modules are switching nodes that have a plurality of input/output (dual) ports and the dual ports are divided into N+1 port groups. One of the port groups is connected to the local sources/sinks, and a remainder of the port groups is connected to the respective N core stages. The N+1 port groups are substantially, but not necessarily, equal in size. Edge modules that have N−1 common coordinates form a sub-net, each of the edge modules in the sub-net being connected to a same one of the core stages.

The invention also provides a method of routing through an N-dimensional lattice network comprising a plurality of edge modules and a plurality of core stages, in which each edge module is connected to N core stages. The method comprises a first step of identifying each edge module in the network using N coordinates, the N coordinates defining a relative position of each edge module in the network with respect to other edge modules in the network. The N coordinates assigned to each edge module are arranged in a predetermined order of a first through an Nth dimension of the network. The coordinates of an edge module are used, in combination with dimension identifiers uniquely associated with the first through the Nth dimensions, to route through the network from a first edge module to a second edge module by associating the respective coordinates of an edge module with the respective dimension identifiers, arranged in a predetermined order, to define a path from the first to the second edge modules.

The method further comprises a step of storing the respective coordinates and the dimension identifiers in a routing array that is forwarded in a connection request message sent towards the second node as a connection is routed through the network. As the connection request message progresses across the network, the routing array is shortened at each intervening edge module in the path to the second edge module by deleting a coordinate and a dimension identifier from the array at the intervening edge module. The coordinate and the dimension identifier deleted are ones that define the next node to which the connection request message is to be sent. The predetermined order of the dimension identifiers used for routing to the second node is determined by computing rotations of a route-set consisting of the dimension identifiers arranged in a predetermined order selected during the route-set generation process.

The invention therefore provides a network structure that can be scaled to a very large number of edge modules having a very high access capacity. Due to the unique method of addressing edge modules in the network, and setting up connections between nodes, routing through the network is extremely simple and efficient. This permits nodes to operate autonomously without direction from a central controller. The edge modules calculate their own routing tables and negotiate connections autonomously. Signaling overhead is thereby reduced and network throughput is correspondingly improved. The N-dimensional network in accordance with the invention therefore provides a network model that can be scaled to support the next generation Internet, and provide a network structure adapted to support many new and innovative telecommunications services.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

This invention relates to a multi-dimensional lattice network in which a plurality of edge modules (i.e., switching nodes connected to data sources/sinks) having unique identities are identified by N coordinates, N representing the number of dimensions in the network. The N coordinates are used for addressing the edge modules within the network. The network includes a plurality of sub-nets, each sub-net including at least two edge modules. The edge modules of each sub-net have N−1 corresponding identical coordinates. The edge modules of each sub-net are also connected directly and exclusively to at least one core switch associated with the sub-net. Every edge module in the multi-dimensional lattice network is connected to a core switch in each of the N-dimensions of the network. The number of dimensions in a network is limited only by the number of ports of the edge modules in the network. The network is therefore scalable to global proportions and the throughput capacity of the network may be scaled to Yotta bits per second, i.e., $10^{24}$ bits per second.

Figure 1:
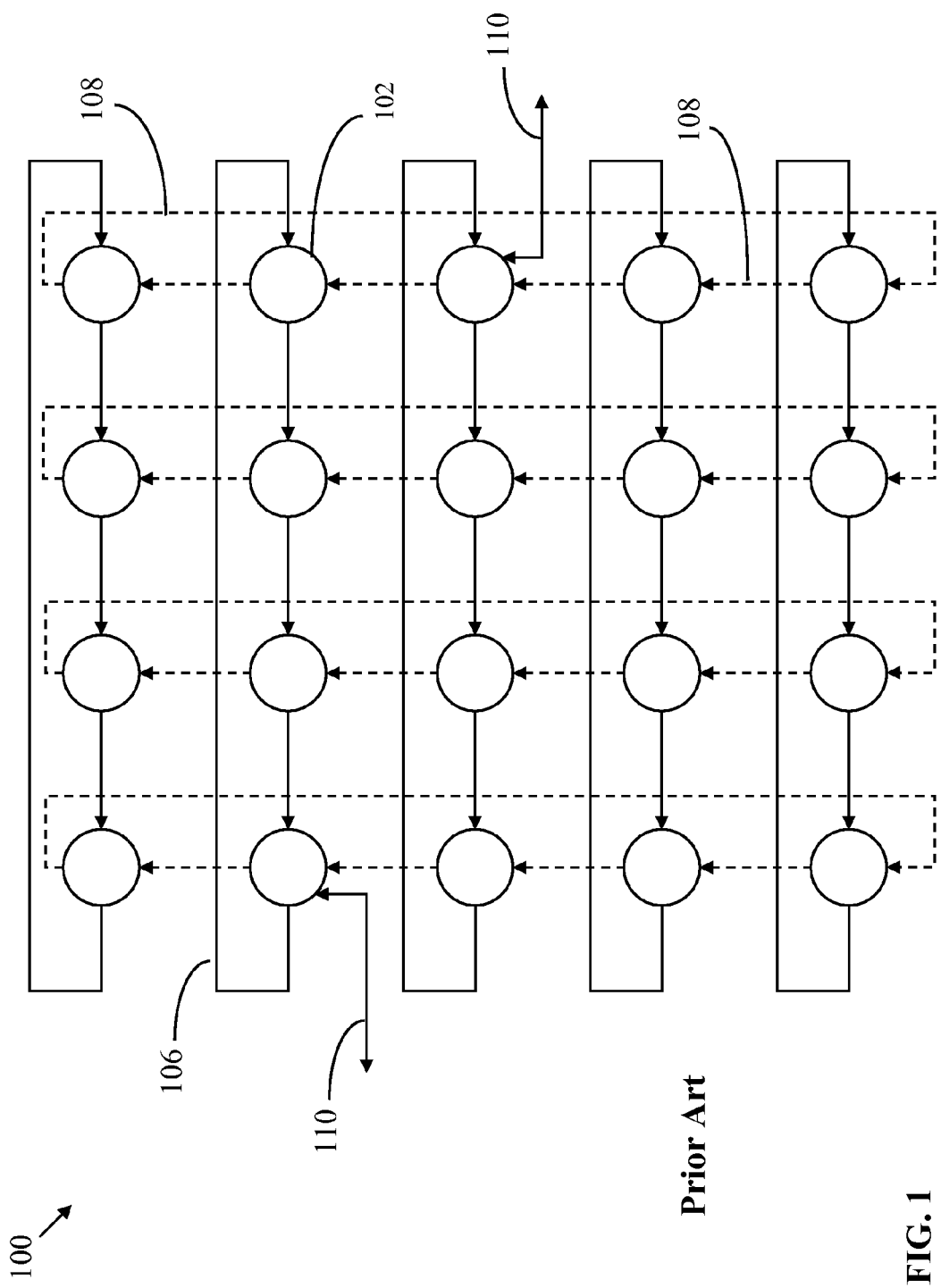
FIG. 1. is a schematic diagram of a prior art mesh network.

FIG. 1 is a schematic diagram of a grid-based mesh network 100 in which a plurality of switching nodes 102 are connected by even numbers of directed rows and columns of links 106, 108. The switching nodes 102 are connected to packet sources and sinks by input/output links 110. This network structure is frequently referred to as a Manhattan street network. While this network structure works well for small networks, it becomes increasingly inefficient as the size of a network increases because the mean number of hops between a source and a sink increases proportionally with the number of nodes per row and the number of nodes per column. Consequently, this network structure is not suited for use as a model for large capacity networks.

Figure 2:
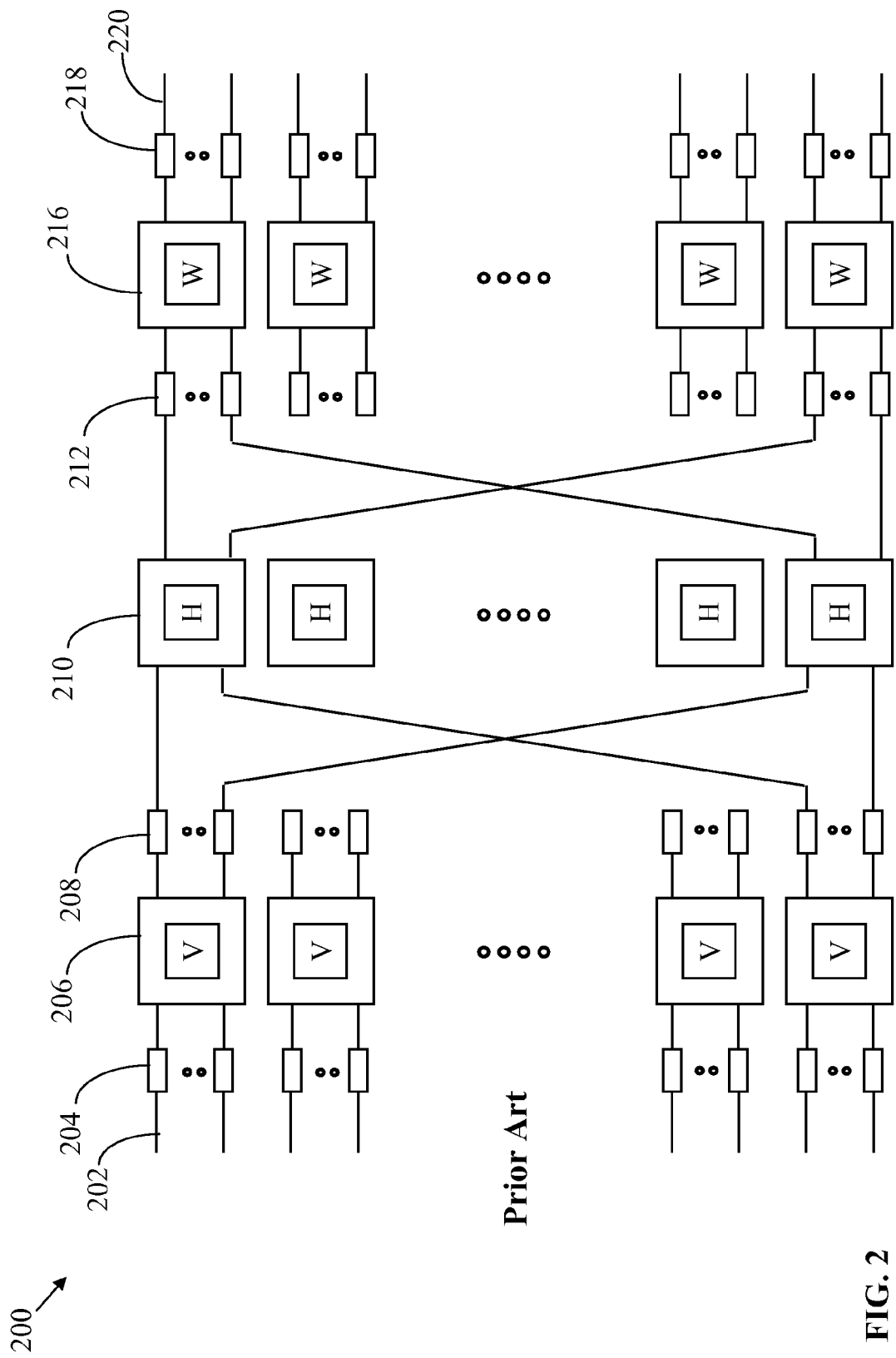
FIG. 2 is a schematic diagram of a Clos network, well known in the prior art.

FIG. 2 is a schematic diagram of a three-stage network in which input (first-stage) switches 206 are connected to output (third stage) switches 216 by center stage switches 210. Input links 202 are connected to the input switches 206 by input buffers 204. The input switches 206 are connected to the center stage switches 210 through alignment buffers 208. Likewise, the center stage switches 210 are connected to the output switches 216 through alignment buffers 212, and the output switches 216 are connected to output links 220 through output buffers 218. As is well known in the art, the three-stage switch 200 is prone to blocking unless there is a capacity expansion of about 2 to 1 in the center stage switches 210. The three-stage switch 200, commonly referred to as a Clos network, can be geographically distributed and can be scaled to about one Tera bits per second.

Figure 3:
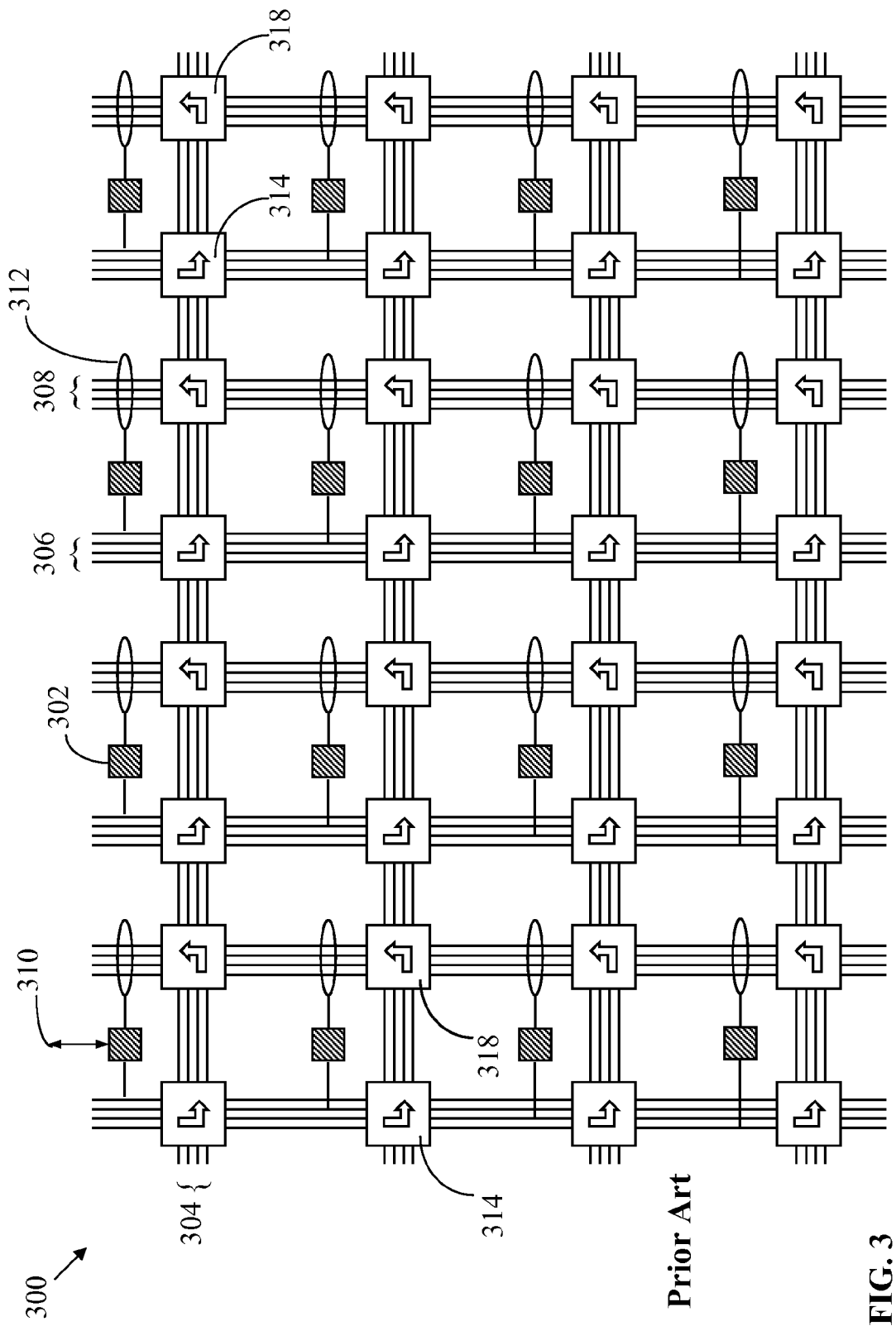
FIG. 3 is a schematic diagram of an implementation of the Clos network shown in FIG. 2 that uses buses as space switches.

FIG. 3 is a schematic illustration of a bus arrangement 300 for a large-capacity Asynchronous Transfer Mode (ATM) switch described by Munter in U.S. Pat. No. 5,499,239. In the bus arrangement 300, the buses are arranged in a mesh pattern with cross-point nodes 302 at each intersection of input and output buses. The buses are arranged in parallel groups of vertical bus lines called the "V" data buses 306, horizontal bus lines called the "H" data buses 304, and a third group of vertical bus lines referred to as the "W" data buses 308. Each "V" bus, or "W" bus has as many channels as the number of nodes 302 per column. Each "H" bus has as many channels as the number of nodes 302 per row. Each node 302 transfers data to a designated channel in a respective "V" bus 306 and receives data from any of the channels of a "W" bus 308. A channel selector 314 transfers ATM cells from any one of the channels of a "V" bus to a designated channel in a respective "H" bus. A channel selector 318 transfers ATM cells from any channel in an "H" bus, to a designated channel in a respective "W" bus. A channel selector 312 permits a node 302 to receive ATM cells from any of the channels of the W buses. This bus structure has the same performance as the three-stage network shown in FIG. 2, because the input switches 206 are functionally equivalent to the V buses, the center stage switches 210 are functionally equivalent to the H buses, and the output switches 216 are functionally equivalent to the W buses.

Figure 4:
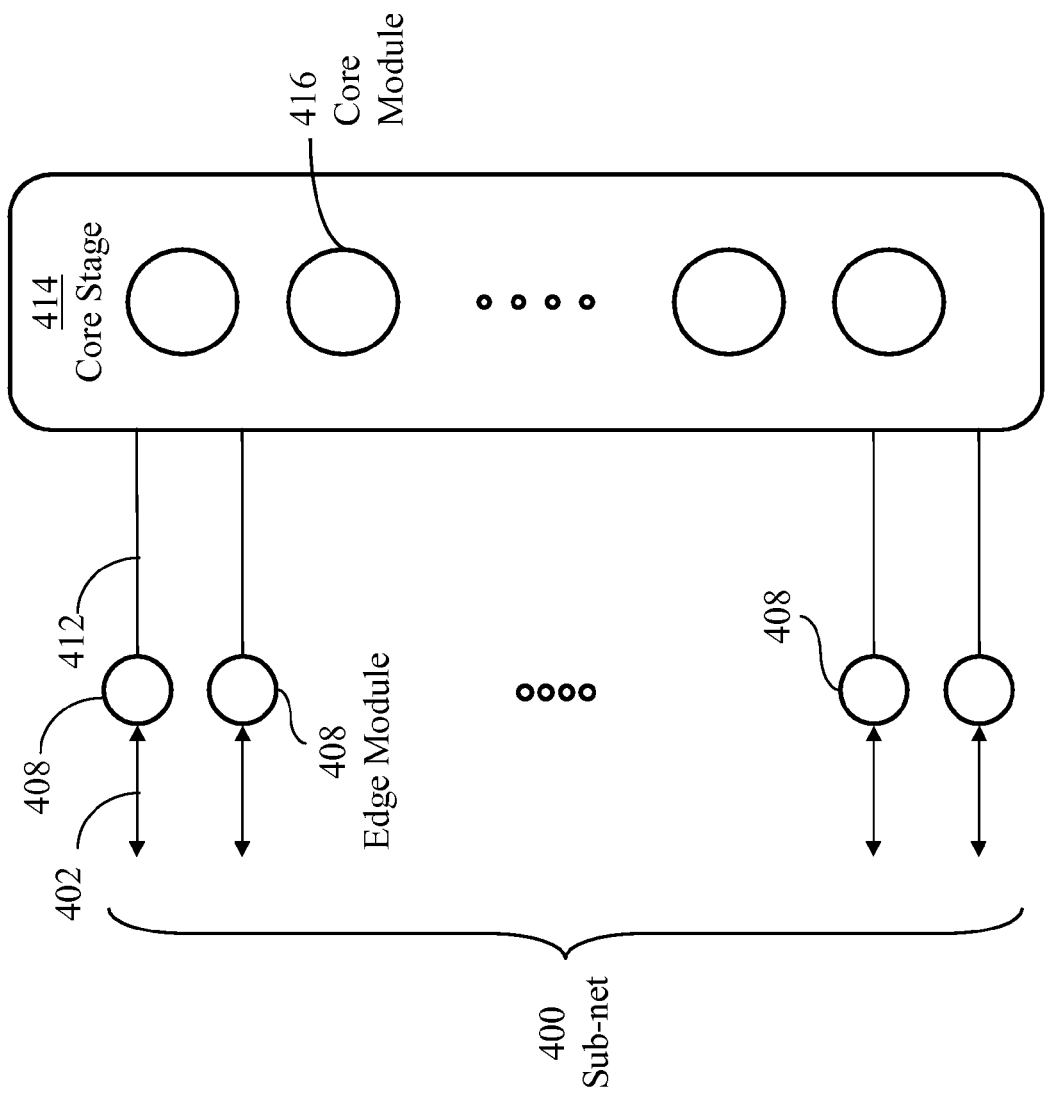
FIG. 4 is a schematic diagram of a sub-net of edge modules interconnected by a core switch in accordance with an embodiment of the invention.
Figure 7:
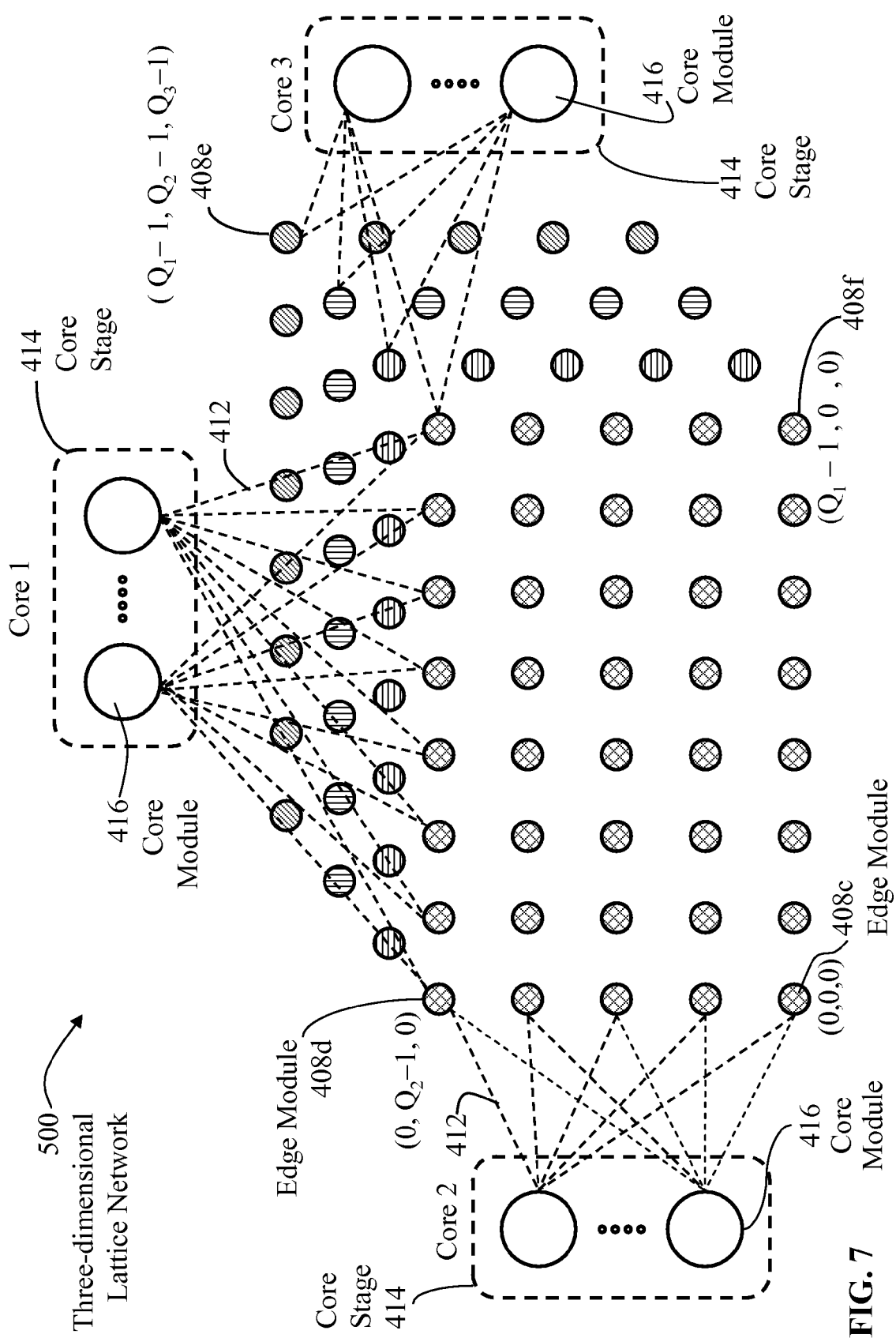
FIG. 7 is a schematic diagram illustrating interconnection of certain of the edge modules shown in FIG. 6 to construct a three-dimensional network in accordance with the invention.

The N-dimensional lattice network (N>1) in accordance with the invention is constructed of a plurality of sub-nets 400 schematically illustrated in FIG. 4. In each sub-net 400, input/output links 402 interconnect data sources and sinks (not illustrated) with edge switches, hereinafter referred to as "edge modules" 408. The edge modules 408 are in turn connected to N core stages 414 (only one is shown) by core links 412. A core stage may be a circuit switch of coarse granularity, switching 10 Gb/s channels for example, conventionally called a cross connector. A core stage may also be a circuit switch of fine granularity, switching time slots of a channel for example, or even a packet switch switching data packets of arbitrary size. The N core stages 414 may be agile sub-networks, as described in Applicant's copending patent application entitled AGILE OPTICAL-CORE DISTRIBUTED PACKET SWITCH filed Dec. 30, 1999 and assigned U.S. patent application Ser. No. 09/475,139, the specification of which is incorporated herein in its entirety. Each agile sub-network may include a plurality of agile core modules 416 (FIGS. 4 and 7). Agile core modules 416 are respectively connected to each of the edge modules 408 in the sub-net 400 by at least one link 412.

Another form of an agile network that may serve as a sub-net in the multi-dimensional structure 500 is based on the use of time-division-multiplexed (TDM) switches in the core in which the time-slot allocation in a predefined time frame may change to follow the traffic variation. The adaptation of the time-frame allocation to traffic variation is realized by coordination with respective edge modules, as described in U.S. patent application Ser. No. 09/550,489, filed Apr. 17, 2000 and entitled HIGH CAPACITY WDM-TDM PACKET SWITCH.

Figure 5A:
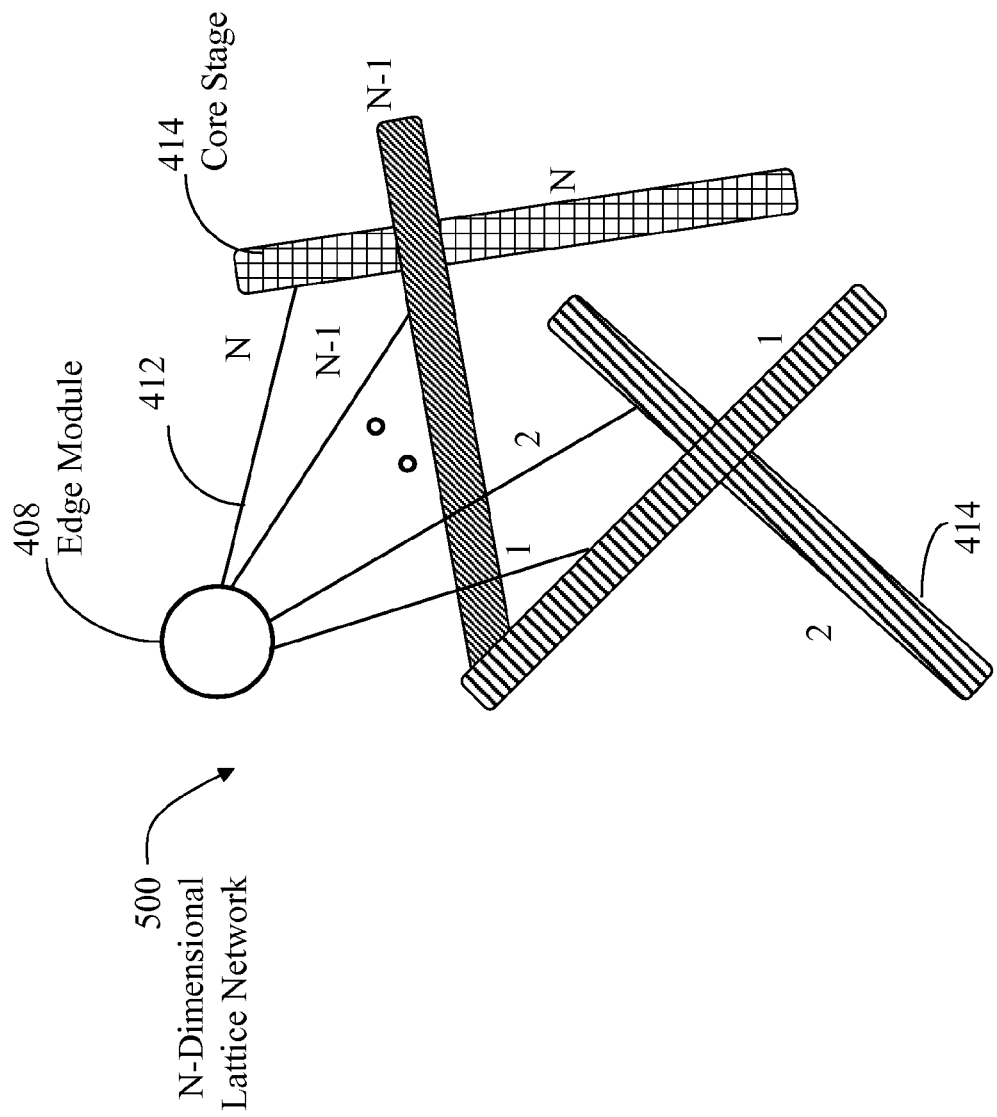
FIG. 5a is a schematic diagram showing the connection of an edge module to N core sub-nets in an N-dimensional lattice network in accordance with the invention.

The sub-nets 400 are arranged in an N-dimensional lattice network 500 shown in FIG. 5*a*. FIG. 5*a* is a schematic diagram showing a portion of an N-dimensional lattice network in which only a single edge module 408 and a plurality of core stages 414 are illustrated for the sake of clarity. The N-dimensional lattice network 500 includes a number $(Q_1 \times Q_2 \times \ldots \times Q_N)$ of edge modules 408, and a number of core stages 414, each core stage 414 being logically oriented along one of the N-dimensions and associated with one sub-net 400. Each core stage 414 is assigned a unique dimension identifier according to its logical orientation in the network. Such core stage may comprise one or more core modules 416. The sub-nets 400 are likewise identified in accordance with a corresponding dimension with which they are associated. Thus, each sub-net oriented in the first dimension is a first-dimension sub-net, each sub-net oriented in a second dimension is a second-dimension sub-net, and so on. In FIG. 5*a* a group of N core stages are represented in different logical orientations, along with one edge module 408 having N links, numbered 1 to N. A link leading to the $j^{th}$-dimension sub-net is called a j-dimension link, $1 \leq j \leq N$. Two-dimensional and three-dimensional implementations of N-dimensional lattice network 500 are illustrated in FIGS. 5*b* and 6, respectively.

Figure 5B:
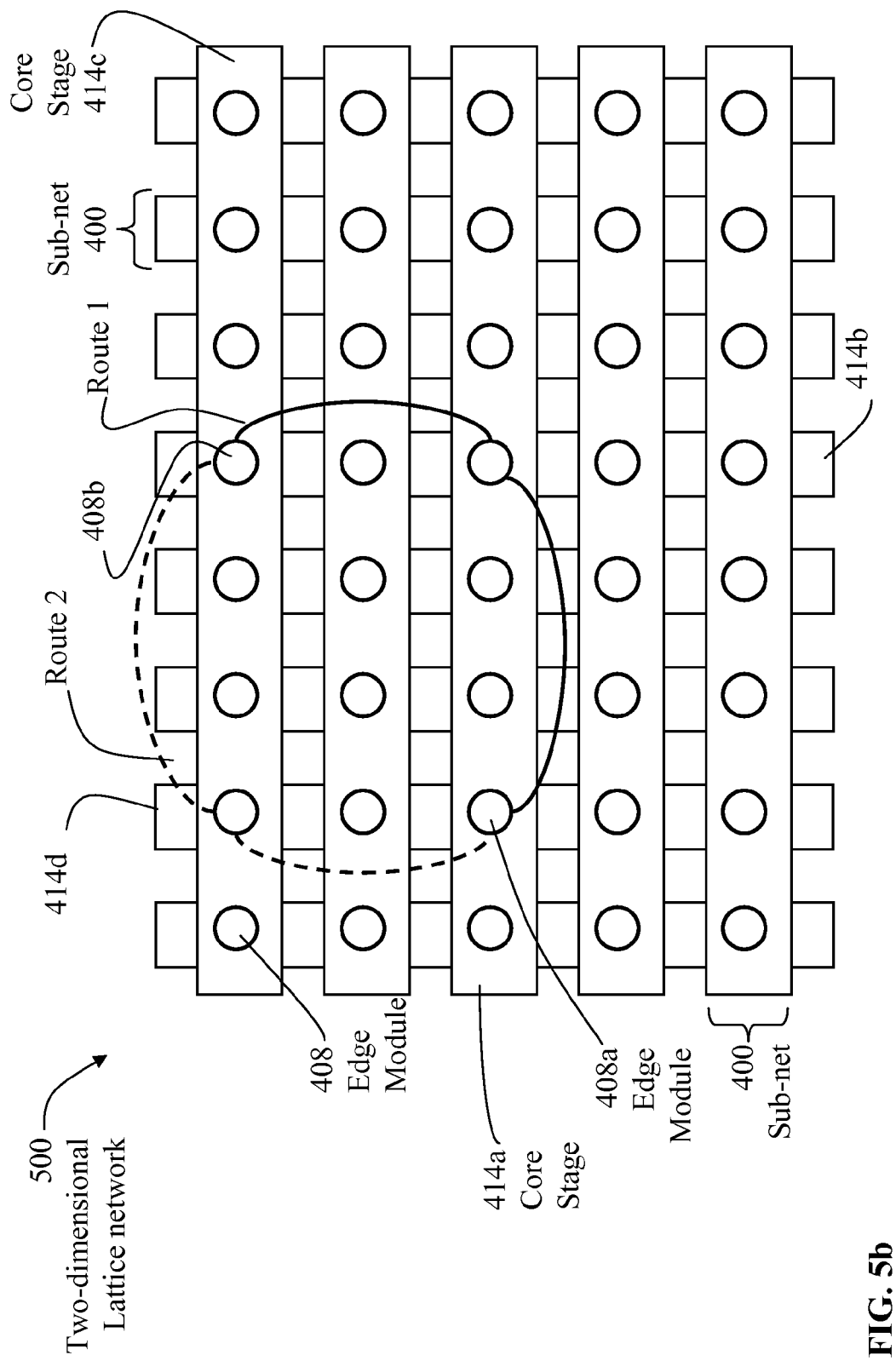
FIG. 5b is a schematic diagram of a two-dimensional network in accordance with the invention.

FIG. 5*b* illustrates a two-dimensional lattice network 500 in accordance with the invention. In the two-dimensional lattice network shown in FIG. 5*b*, a plurality of edge modules 408 are interconnected by a plurality of core stages 414 which may be, for example, cross-connections, optical switches, or electronic packet switches. The core stages may also be, as described in Applicant's copending patent applications referred to above, distributed switches. The core stages 414 may likewise be agile core switches, as described above. The edge modules 408 connected to any one core stage 414 are collectively referred to as a sub-net 400 although each edge module 408 is a member of N sub-nets in an N-dimensional lattice network 500. The number of edge modules 408 in each sub-net is arbitrary, as is the geographical location of the respective edge modules 408 in any given sub-net. Although the edge modules 408 are interconnected in a logical, juxtaposed relationship as shown in FIG. 5*b*, the physical relationship between the edge modules 408 and the core stages 414 is preferably governed by traffic patterns and other factors which are beyond the scope of this disclosure. For the purposes of the invention, the edge modules 408 in the N-dimensional lattice network 500 in accordance with the invention are interconnected in logical rows and columns to form sub-nets 400. The number of sub-nets 400 in an N-dimensional lattice network 500 is likewise arbitrary, and the N-dimensional lattice network in accordance with the invention appears to be scalable without practical constraint. It should be noted that the structure of the N-dimensional network shown in FIGS. 5*a* and 5*b* facilitates routing through the network, as will be explained below with reference to FIG. 12.

Figure 6:
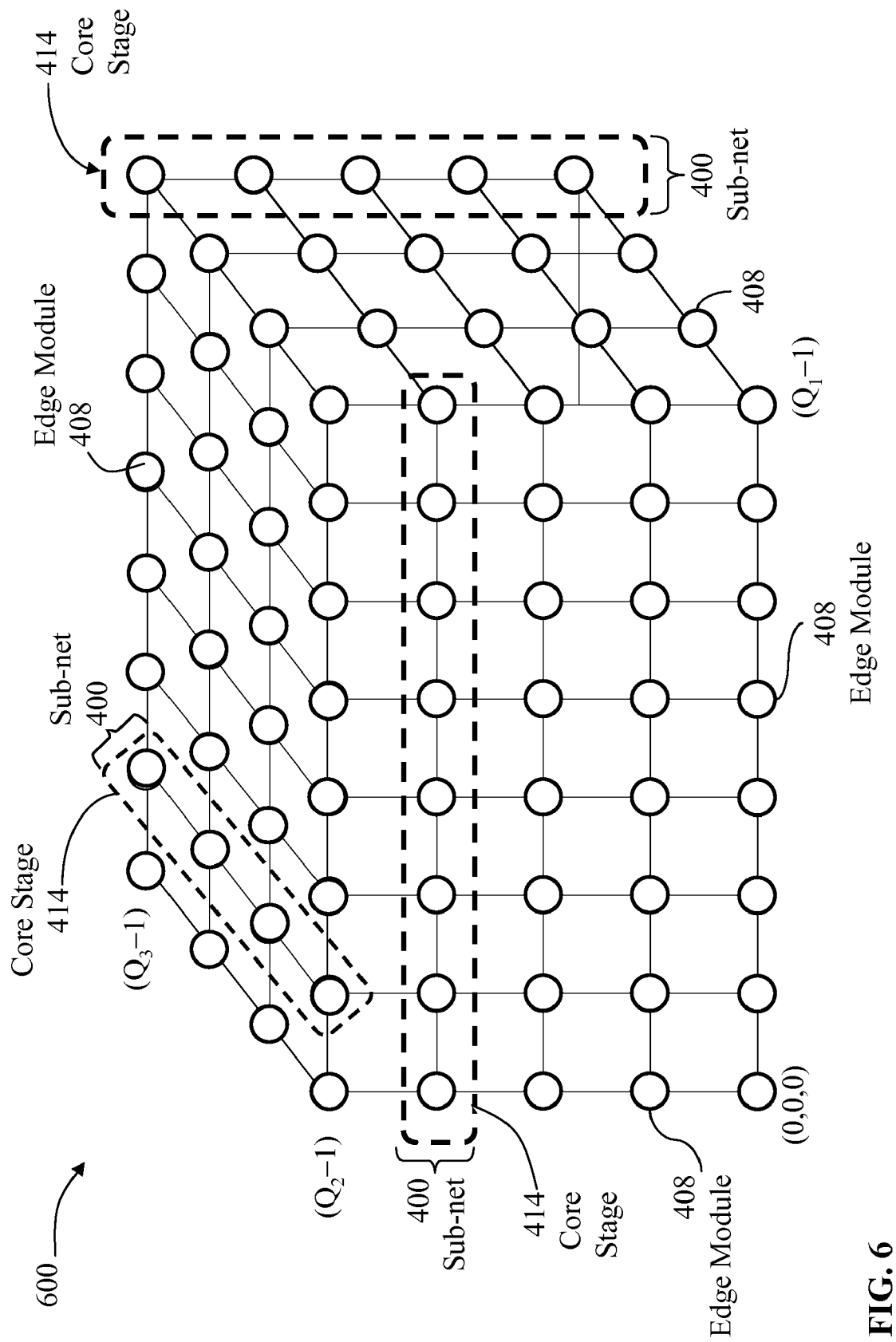
FIG. 6 is a schematic diagram of a three-dimensional network in accordance with the invention.

FIG. 6 is a schematic diagram of a three-dimensional arrangement of the N-dimensional network 500 in accordance with the invention. For the sake of simplicity, only the edge modules 408 which appear at the side, top and end "surfaces" of the three-dimensional network are shown. It should be understood, however, that the three-dimensional network includes many more sub-nets 400 which are not illustrated. Each edge module 408 in the three-dimensional lattice network shown in FIG. 6 is connected to three core stages 414. The number of edge modules, $Q_1$, $Q_2$, or $Q_3$, in the three dimensions is, as noted above, substantially arbitrary, though for purposes of addressing and ease of control within each sub-net, is preferably limited to about 256 edge modules 408. This is not a restrictive limit, however, and each sub-net may scale to about 1000 edge modules with a combined user-access capacity per sub-net of about 1 Peta bits per second given today's switching technology.

FIG. 7 is a schematic diagram of the three-dimensional network shown in FIG. 6, illustrating the connection of three core stages 414 (labeled core 1, core 2 and core 3) with respective edge modules 408 in three of the sub-nets in the network. As is apparent, each edge module 408 is connected to a respective core switch module 416 by at least one input/output link 412. If the core stages 414 are modular core stages as shown in FIG. 7, each edge module 408 is connected to each of the core modules 416 by at least one input/output link 412. As will be explained below in more detail with reference to FIG. 9, each of the edge modules 408 is addressed using its logical position in the N-dimensional network 500. For example, the edge module 408*c* at the lower left corner of the three-dimensional network shown in FIG. 7 has an address of (0, 0, 0). The edge module 408*d* shown at the top left corner of FIG. 7 has an address of $(0, Q_2-1, 0)$. Whereas the edge module 408*e* at the top right hand corner of FIG. 7 has an address of $(Q_1-1, Q_2-1, Q_3-1)$, and the edge module 408*f* at the bottom right hand corner of FIG. 7 has an address of $(Q_1-1, 0, 0)$.

Figure 8:
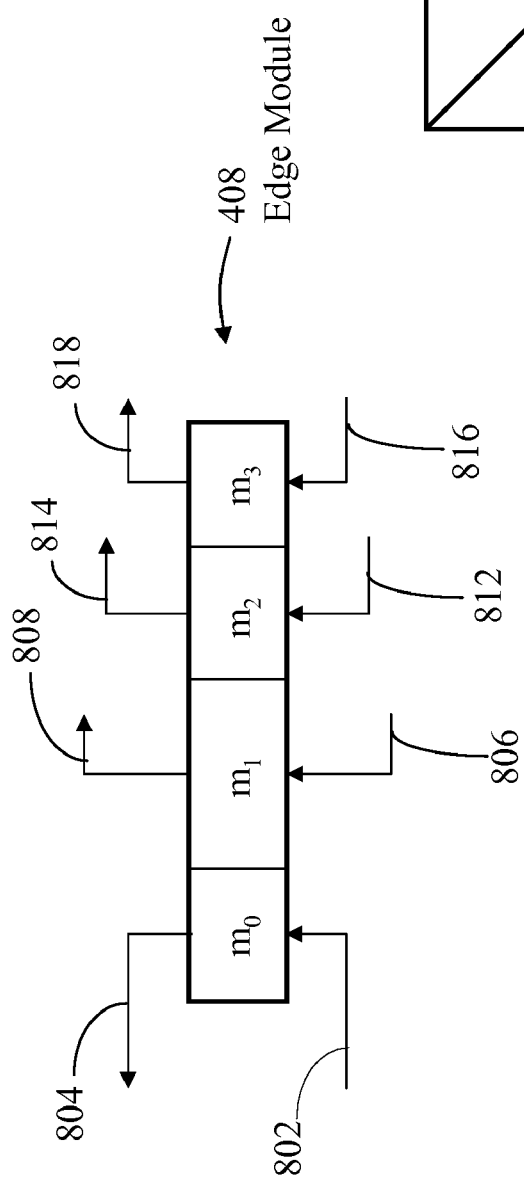
FIG. 8 is a schematic diagram of the partitioning of ports of an edge module in the network in accordance with the invention, the ports being partitioned into port groups, the respective port groups being respectively assigned to serve local traffic, and each of the dimensions in an N-dimensional lattice network.

FIG. 8 is a schematic diagram illustrating the allocation of input/output ports (dual ports) of an edge module 408 in an N-dimensional lattice network 500 in accordance with the invention. The dual ports are divided into N+1 groups. The edge module 408 shown in FIG. 8 is an edge module in the three-dimensional lattice network shown in FIGS. 6 and 7. Input links 802 and output links 804 are connected to input/output port group $m_0$, while input links 806 and output links 808 are connected to port group $m_1$. Likewise, input links 812 and output links 814 are connected to port group $m_2$, while input links 816 and output links 818 are connected to port group $m_3$. The number of input/output ports allocated to each port group is dependent on the number of switching modules 416 in each of the core stages 414 that serve the respective sub-nets of which the edge module 408 is a member. The number of switching modules 416 in each core stage 414 is in turn related to the number of edge modules 408 in the sub-net served by the core stage 414. The ports in port group $m_0$ are connected to local data sources and sinks. The ports of port group $m_1$, are connected to the core stage 414 in the first dimension of the three-dimensional network, while the ports in port groups $m_2$ and $m_3$ are respectively connected to core stages 414 in the second and third dimensions. The values of $m_1, m_2, \ldots, m_N$ are preferably, but not necessarily, selected to be comparable to the value of $m_0$ to ensure high performance under diverse spatial traffic distributions.

The access capacity of the network is the sum of the capacities of the input ports allocated to receiving traffic from traffic sources. The access capacity is determined by the number of input/output ports, the capacity per port, and the number of edge modules in each of the N dimensions. In an N-dimensional lattice network having identical edge modules, with each edge module having $m_0$ input/output ports allocated to traffic sources and sinks, each input/output port having an input capacity of R bits per second, and with $q_j$ edge modules in dimension j, $1 \leq j \leq N$, the total capacity C of the network is determined by:

$$C = R \times m_0 \times (Q_1 \times Q_2 \times \ldots \times Q_N).$$

where:

C=total capacity of the N-dimensional network;
R=capacity of a link;
$m_0$=number of links per edge module; and
$Q_n$=number of edge modules in dimension N.

Thus, with N=4, R=10 Gb/s, $m_0$=100, and $Q_1=Q_2=Q_3=Q_4$=256, the capacity C is roughly $4 \times 10^{21}$, i.e., 4 Zeta bits per second. With N=5, $m_0$=80, and $Q_1=Q_2=Q_3=Q_4=Q_5$=256, the capacity C is $0.8 \times 10^{24}$, i.e., 0.8 Yotta bits per second.

Figure 9:
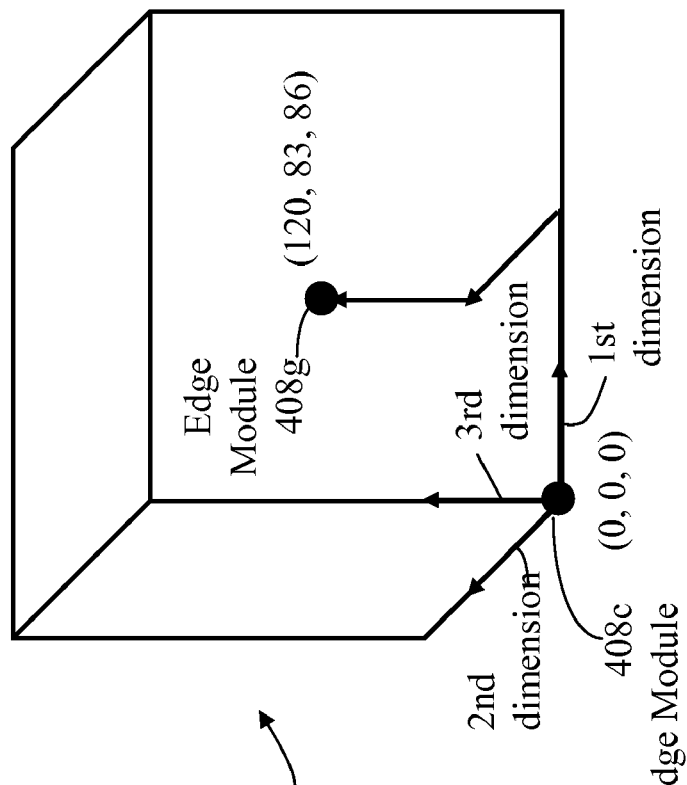
FIG. 9 is a schematic diagram illustrating a coordinate system used for addressing the edge modules in a three-dimensional network in accordance with the invention.

FIG. 9 is a schematic diagram showing the addressing scheme used in the N-dimensional lattice network 500 in accordance with the invention. The N-dimensional lattice network 500 shown in FIG. 9 is a three-dimensional network. Only two edge modules 408c and 408g are illustrated for the sake of clarity. Edge module 408c has a network address of (0, 0, 0). Edge module 408g has a network address of (120, 83, 86). The address is derived from the logical position of each edge module 408 in the respective sub-nets to which it belongs. For example, edge module 408c is in the 0 position of each of the first, second and third dimensions of the N-dimensional lattice network 500. Edge module 408g, on the other hand, is the $120^{th}$ position on the first dimension, the $83^{rd}$ position on the second dimension and the $86^{th}$ position on the third dimension with respect to edge module 408c. This addressing scheme forms the basis for a simple, autonomous, decentralized routing algorithm in accordance with the invention as will be explained below with reference to FIGS. 10-14.

Figure 10:
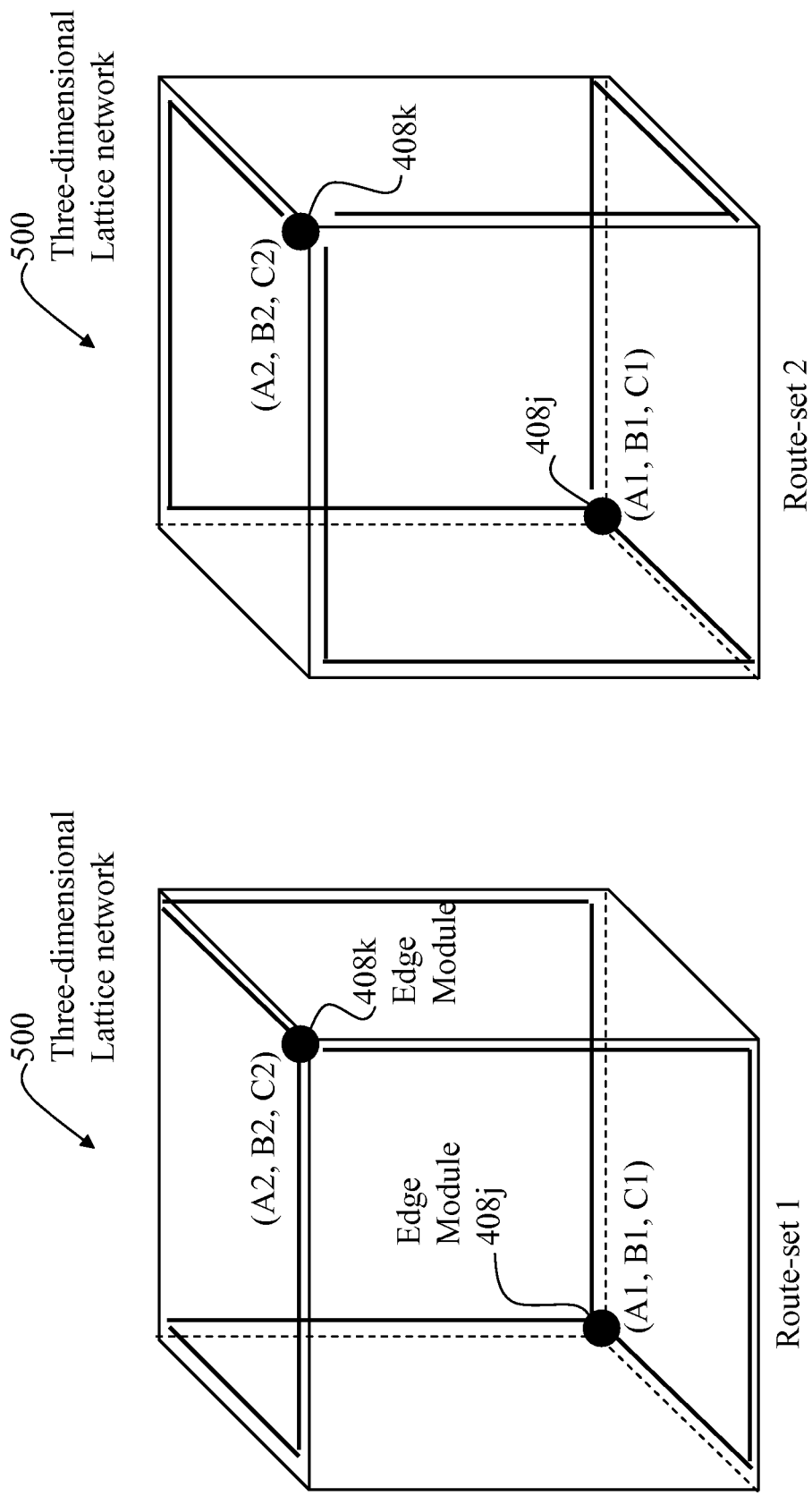
FIG. 10 is a schematic diagram illustrating route-sets in a three-dimensional network which define mutually exclusive paths referred to as "parallel routes" between two edge modules in the N-dimensional lattice network in accordance with the invention.

In the N-dimensional lattice network in accordance with the invention, preferably only one route-set is used to establish connections for each pair of edge modules 408. Routes in the route-set are attempted in a predetermined order when a connection between a pair of edge modules 408 is required. In order to minimize the probability of blocking during connection attempts using a route-set in accordance with the invention, the route-set preferably includes only mutually-exclusive paths between the edge modules 408 in each edge module pair. Mutually-exclusive paths are paths between the pair of edge modules 408 that do not intersect at any point on the route. FIG. 10 schematically illustrates two route-sets in a three-dimensional lattice network between edge modules 408j and 408k having respective coordinates (A1, B1, C1) and (A2, B2, C2). Paths between the edge modules 408j, 408k are called "mutually-exclusive" paths if the paths do not traverse any common links. Paths are not mutually-exclusive if any link in the path is traversed by another path in the same route-set. The advantage of using a route-set consisting of mutually-exclusive paths is that the connection setup process is more likely to succeed because the same links are not retried.

Figure 11:
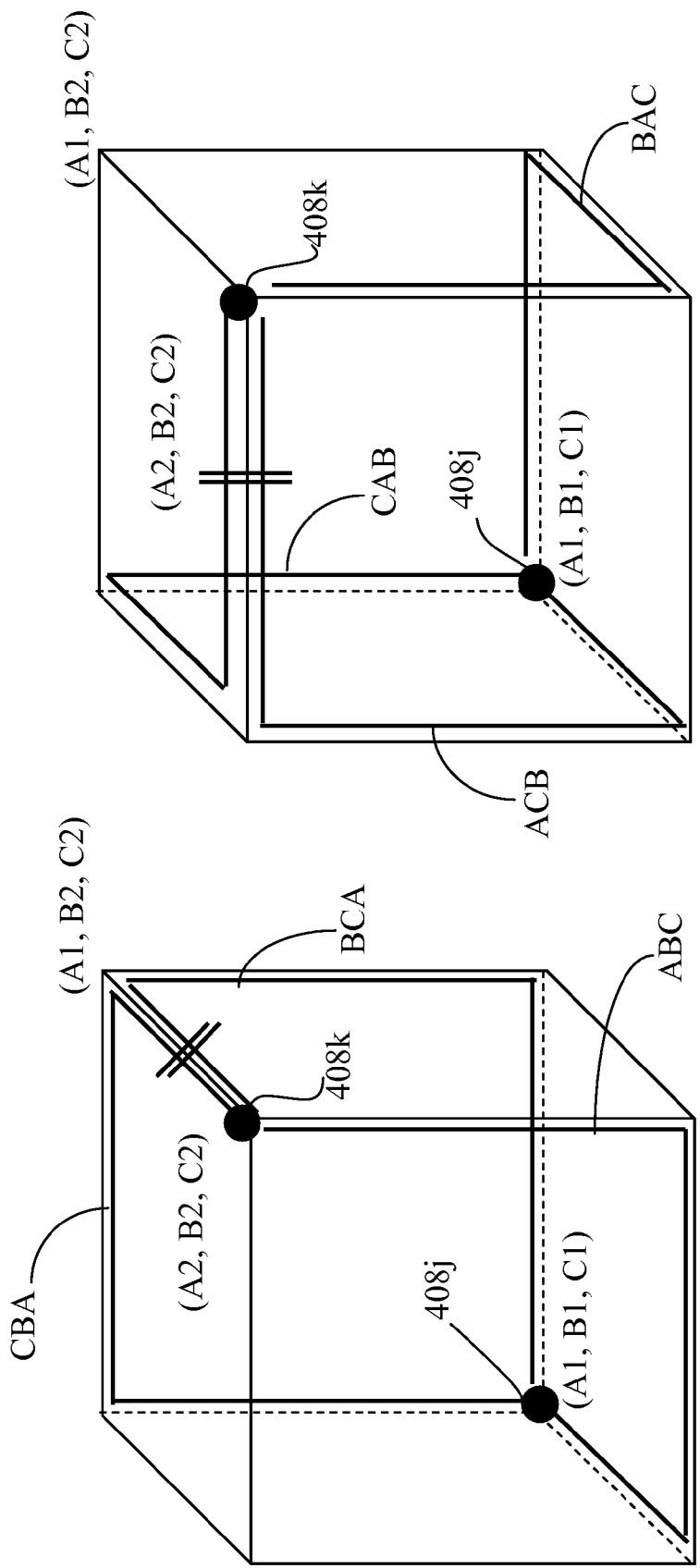
FIG. 11 is a schematic diagram illustrating route-sets for a three-dimensional network in which an intersection occurs because the route-sets do not follow a "rotation"

FIG. 11 illustrates two more route-sets between edge modules 408j, 408k in which the routes are not mutually-exclusive. In the example shown in FIG. 11, route-set 3 includes routes generated by rotations BCA and CBA which intersect between edge modules having address (A1, B2, C2) and (A2, B2, C2). In route-set 4 shown in FIG. 11, routes generated by rotations ACB and CAB also have intersecting paths. (Following a rotation BCA means that the route from a source edge module to a sink edge module progresses along the B direction first, then along the C direction, and finally along the A direction.)

In order to facilitate an understanding of routing in accordance with the invention, reference is made once more to FIG. 5b. FIG. 5b illustrates two routes in a two-dimensional network between edge modules 408a and 408b. Route 1 passes through core stages 414a and core stages 414b while route 2 passes through core stages 414d and 414c. These two routes are representative of the two-hop routes which exist between any two pairs of edge modules 408 in a two-dimensional lattice network in accordance with the invention. As will also be apparent, the switching between successive edge modules in each route is direct switching through the core stages 414.

Figure 12:
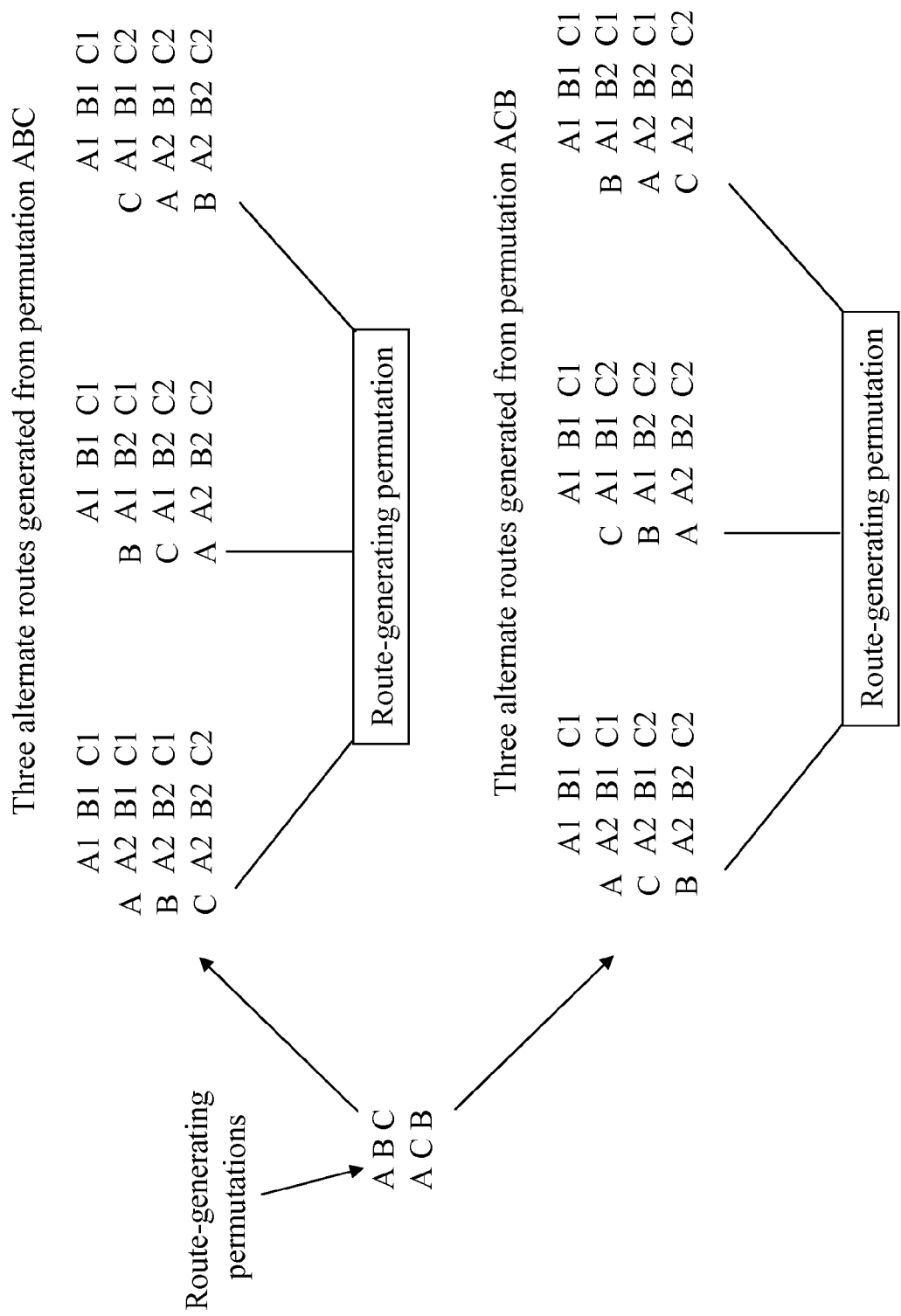
FIG. 12 schematically illustrates a method of constructing route-sets consisting of non-intersecting routes in a three-dimensional network in accordance with the invention.

FIG. 12 illustrates a method of determining mutually-exclusive paths for route-sets in an N-dimensional network 500 in accordance with the invention. In accordance with the method, each dimension in the network is assigned a unique identifier. This is conveniently a binary code of $\lceil \log_2 N \rceil$ bits ($\lceil \log_2 N \rceil$ is the nearest integer not less than $\log_2 N$). For a network of four dimensions, for example, two bits are used to identify the four dimensions. The unique identifiers are then arranged in any order, their logical order of "00, 01, 10, 11", for example, and (N−1) of the unique identifiers are permuted to yield factorial (N−1) permutations, each of which is further rotated to generate N mutually-exclusive paths for any pair of edge modules in the network. This operation is so simple that each edge module preferably computes its own route-sets, as will be explained below in more detail. FIG. 12 shows an example of the method based on the three-dimensional lattice network 500 shown in FIG. 6. For any given N-dimensional network in accordance with the invention, the number of route-set generating permutations is factorial (N−1). Therefore, in a three-dimensional lattice network, the number of route-set generating permutations is two factorial (2!), i.e., 2. In FIG. 12, the letters A, B and C are used to uniquely identify the three dimensions in the three-dimensional network rather than the binary codes, in order to facilitate the description. As shown in FIG. 12 and discussed above with reference to FIGS. 10 and 11, the two route-generating permutations for a three-dimensional network are ABC and ACB wherein the respective letters represent switching along a dimension of the network as illustrated in FIGS. 10 and 11 wherein the first dimension is represented by A, the second dimension is represented by B and the third dimension is represented by C. As shown in FIG. 12, the route-generating permutation ABC generates three routes between edge modules 408 having addresses (A1, B1, C1) and (A2, B2, C2). The route-generating permutation ACB also generates three routes between edge modules 408 having those respective addresses. The method of selecting a single route-set to be used between the edge modules 408j, 408k (FIGS. 10, 11) is explained below with reference to FIG. 15.

Figure 13:
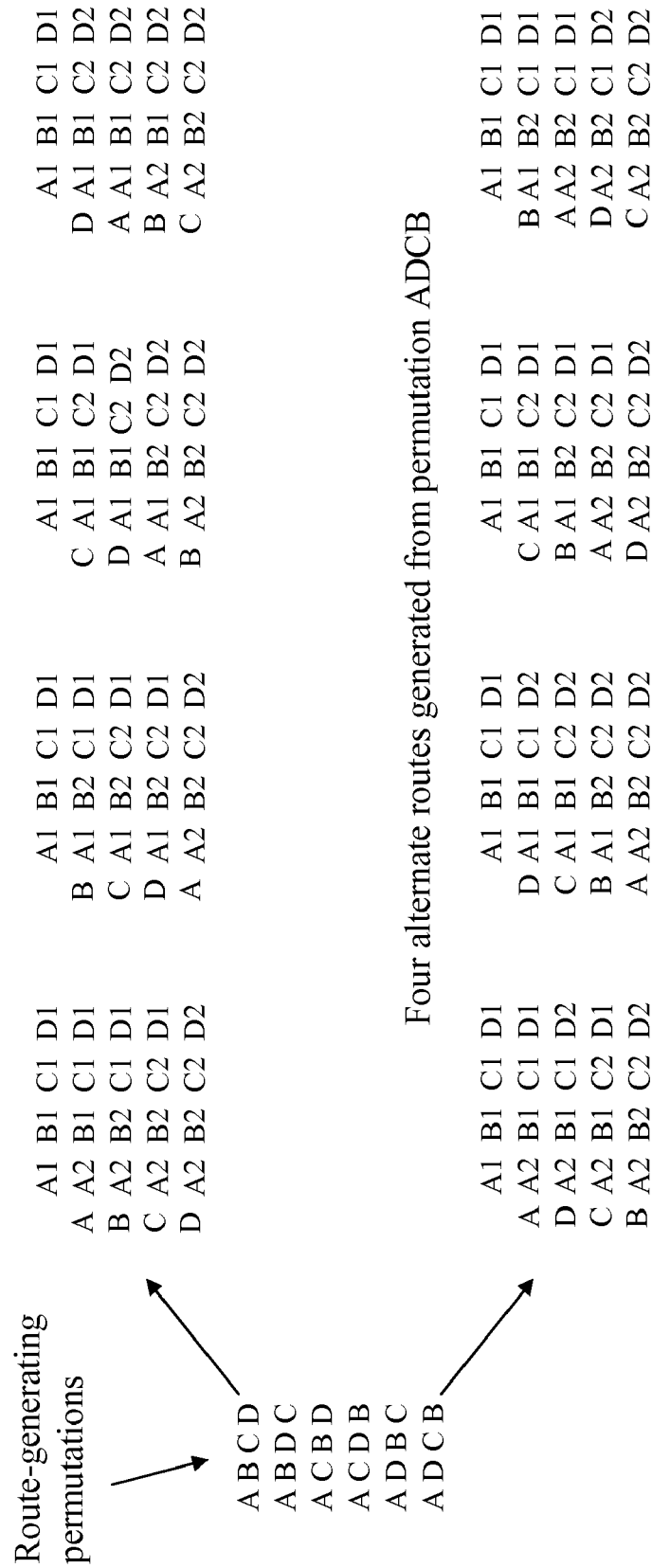
FIG. 13 is a schematic diagram that illustrates a method of constructing route-sets consisting of non-intersecting routes in a four-dimensional network in accordance with the invention.

FIG. 13 illustrates a method of determining mutually-exclusive paths in a four-dimensional lattice network in accordance with the invention. The paths are routes from a first edge module 408 having an address (A1, B1, C1, D1) and a second edge module 408 having an address (A2, B2, C2, D2). As noted above, the number of route-set generating permutations is factorial (N−1), i.e., 3!=6 for a four-dimensional lattice network. As shown in FIG. 13, the six route-generating permutations are ABCD; ABDC; ACBD; ACDB; ADBC; and, ADCB. Each in turn generates four alternate routes for mutually-exclusive paths between the respective edge modules 408. It is noted that the generation of the permutations is a well-known procedure.

Figure 14:
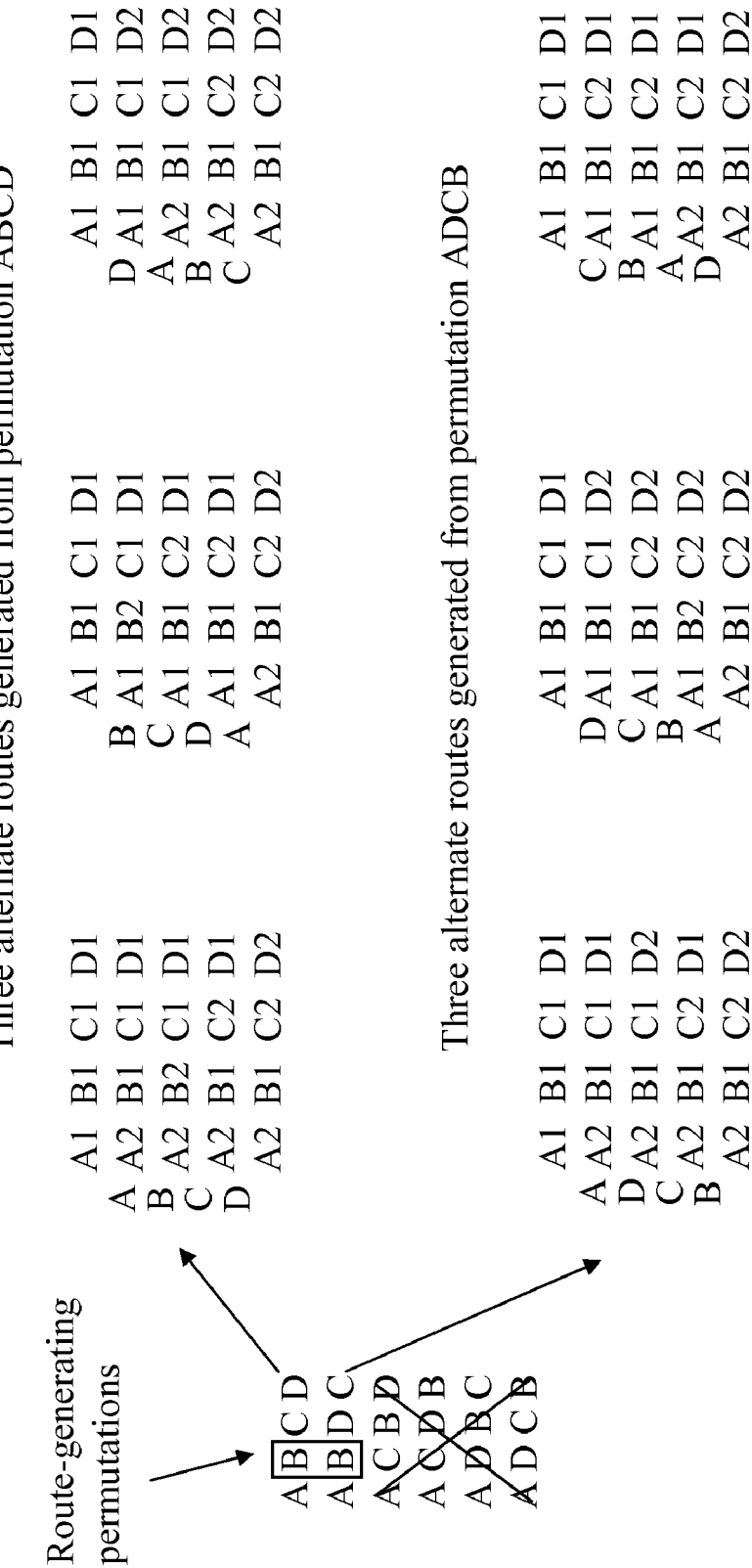
FIG. 14 illustrates the route construction process shown in FIG. 13 when the source and sink nodes have one or more identical coordinates in a network in accordance with the invention.

In an instance where an origination edge module and termination edge module share identical corresponding coordinates, the route-set generation process is facilitated by reducing the number of dimensions for which route-generating permutations are required by the number of identical corresponding coordinate pairs. For example, FIG. 14 illustrates a method of determining mutually-exclusive routing paths for a four-dimensional lattice network in which a first edge module 408*j* has an address (A1, B1, C1, D1) and a second edge module 408*k* has an address (A2, B2, C2, D2) and the mutual coordinates B1 and B2 are identical. The dimensions of the network for the purpose of determining mutually-exclusive paths is therefore reduced by one. Consequently, the number of route-generating permutations is reduced from 6 to 2 ((3−1)!=2). As a result, the only route-generating permutations that need be considered in selecting mutually-exclusive paths between the addresses of the edge modules 408*j*, 408*k* in a four-dimensional network in which the corresponding coordinates B1 and B2 are identical, are the permutations in which the B coordinates are in the same position in the permutation. As shown in FIG. 14, those two permutations are ABCD and ABDC, respectively. Each permutation generates three alternate routes, as shown in FIG. 14.

Figure 15:
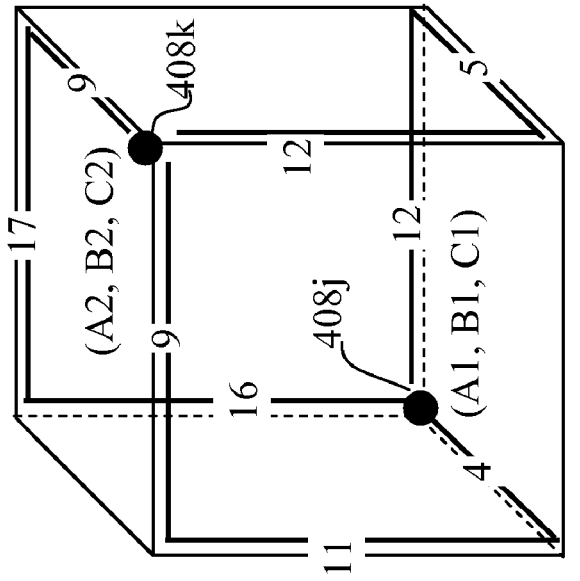
FIG. 15 is a schematic diagram illustrating a step of evaluating route-sets to determine their respective merit.
Figure 15:
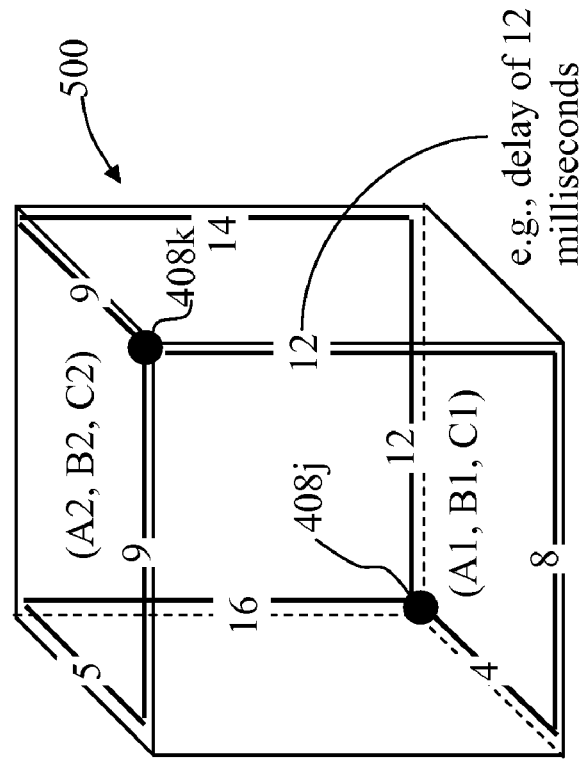

In accordance with the invention, the route-sets are preferably computed by each edge module 408 as required. The route-sets need be derived only when topological changes are introduced in the N-dimensional lattice network 500. Since the network is multi-dimensional and the core stages 414 are preferably agile and reconfigure as required, as explained in Applicant's copending patent applications incorporated by reference above, route-sets need not be recomputed in the event of failed links unless very large sectors of the network fail simultaneously, which is highly improbable. In addition, the provision of N parallel mutually-exclusive routes per node pair facilitates re-routing if one of the routes fails. As noted above, each edge module 408 preferably retains only one set of routes to each of the other edge modules 408 in the N-dimensional lattice network 500. Only the generating permutation of the route-set, rather than the routes' description, need be stored. The retained route-set is preferably selected based on merit. Merit can be defined in any number of ways. For example, the propagation delay of the links in the route-set can be used as a measure of merit. The shorter the propagation delay, the higher the merit of the link. FIG. 15 shows an example of route-set selection based on a merit criteria. In this example, the propagation delay is computed for each of the respective links in the mutually-exclusive paths between the edge modules 408 having respective addresses (A1, B1, C1) and (A2, B2, C2). By summing up the propagation delay of the links in each route-set, the edge module 408*j* determines which route-set is preferred. Accordingly, route-set 1 yields a merit index of 89 in the example shown in FIG. 15, while route-set 2 yields a merit index of 95. Since the merit index is based on propagation delay and is therefore related to cost, route-set 1 has the highest merit and is selected as the route-set to be used between edge module (A1, B1, C1) and edge module (A2, B2, C2).

Figure 16:
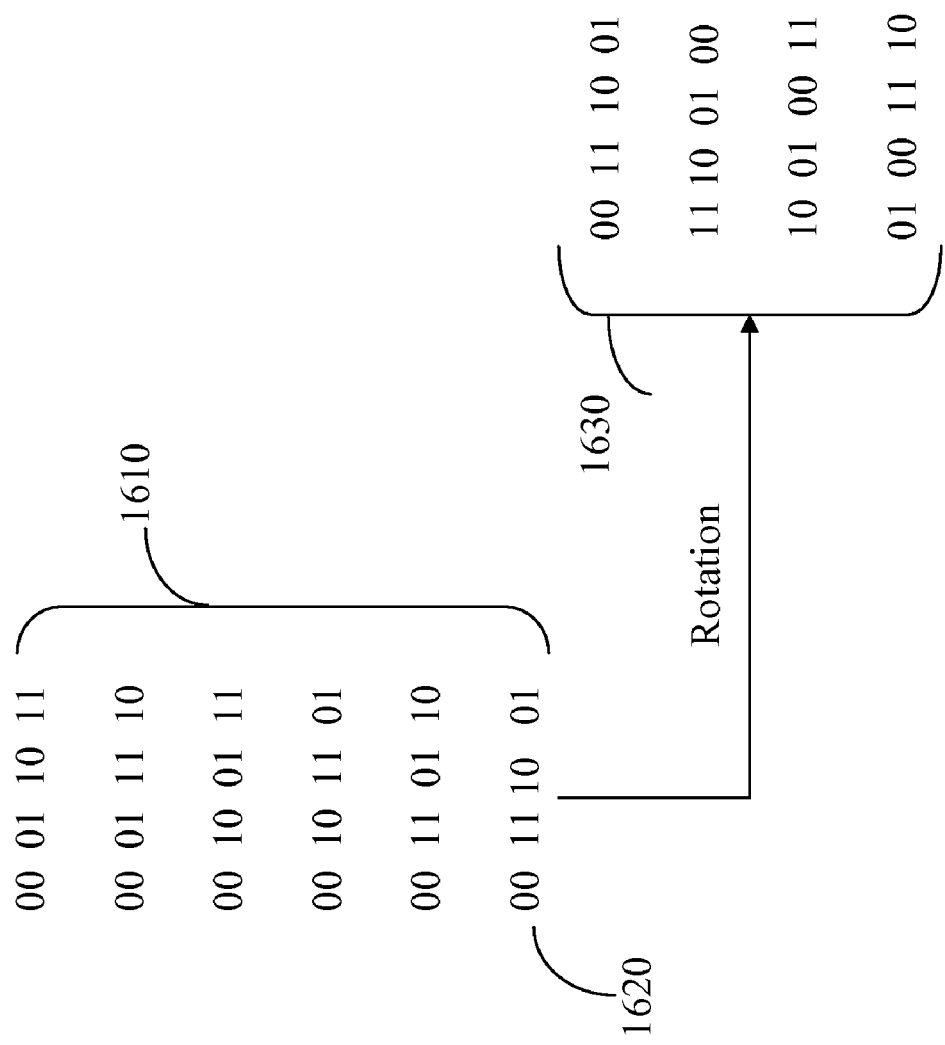
FIG. 16 is a schematic diagram illustrating the generation of a route-set used for connection setup in an N-dimensional lattice network.

Edge modules 408 in accordance with the invention, preferably store route-set generating permutations very economically in N times $\lceil \log_2 N \rceil$ bits per permutation. For example, in a 4-dimensional lattice network, one byte is needed per permutation. That byte of information is divided into adjacent unique dimension identifiers that are used for selecting a route to a termination edge module. The unique dimension identifiers are used in conjunction with the address of the termination edge module to select a path to the termination edge module when a connection between the origination edge module and the termination edge module is requested. That assignment of the unique dimension identifiers is consistently used throughout an N-dimensional network in accordance with the invention. The axis with which a dimension identifier is associated is immaterial provided that the identifier is consistently used in instructions sent to other edge modules in the network. As shown in FIG. 16, a plurality of route-sets 1610 are stored in an edge module 408 in a 4-dimensional lattice network. The route-sets are used to set up connections by generating a rotation of the route-set. A rotation 1630 of route-set 1620 is shown in FIG. 16. Rotation 1630 is used to select a route to the termination edge module, as will be explained below with reference to FIG. 18.

Figure 17:
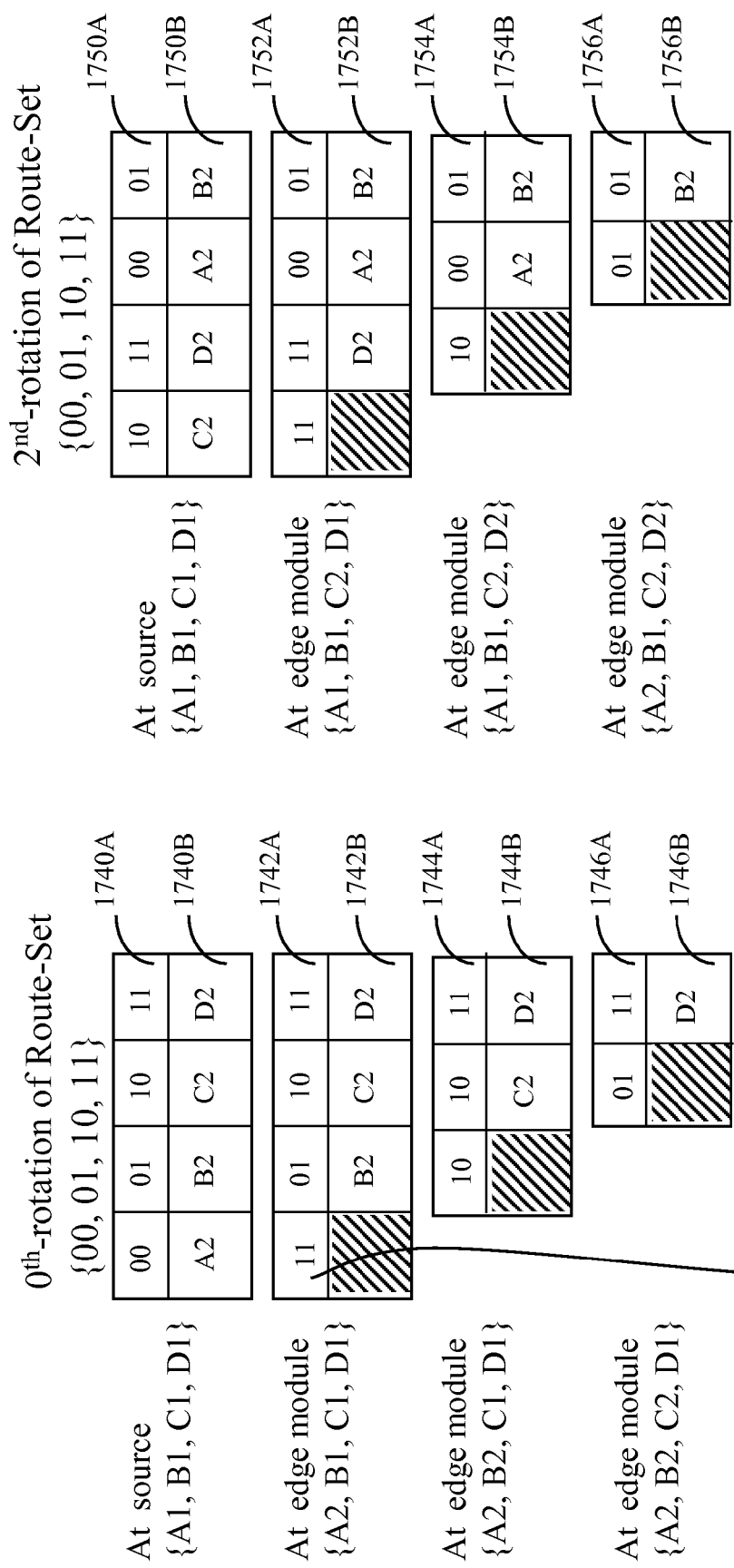
FIG. 17 is a schematic diagram of a portion of a connection request message as it traverses a four-dimensional lattice network in accordance with the invention.

FIG. 17 shows the use of the rotations 1630 for setting up a connection across an N-dimensional lattice network 500 in accordance with the invention. At the origination edge module (A1, B1, C1, D1) the $0^{th}$ rotation is selected and used to formulate a connection setup message that includes the dimension identifiers in the $0^{th}$ rotation of the rotation set 1630 shown in FIG. 16. Associated with each dimension identifier is the corresponding coordinate of the termination edge module (A2, B2, C2, D2). These are respectively stored in routing arrays 1740A, 1740B of the connection setup message. Arrays 1740A and 1740B may be viewed as a single array of records, each record having two fields, the first containing a dimension identifier, and the second containing an edge module identifier within the respective dimension. The message further stores a bit-rate (not illustrated) requested by the source, for which the connection is being set up. As will be explained below in more detail, the routing arrays in the connection setup message are progressively shortened as the message traverses the network, so that only the requested bit-rate is passed to the termination edge module 408. The actions of the termination edge module 408 during connection setup are explained below in greater detail. Thus, before sending the connection setup message, the origination edge module deletes the address of the first edge module (in this example A2) from array 1740B and substitutes the dimension identifier in the first column of array 1740A with a binary number indicating the number of remaining records (i.e., binary "11", which equals 3). The array 1742A, along with the shortened address array 1742B, are forwarded to the next edge module, as will also be explained below in more detail. This process continues as the connection setup request traverses the network as shown in arrays 1744A, 1744B and 1746A, 1746B. If the $0^{th}$ rotation fails at any of the intervening edge modules because of lack of capacity on any of the links in the route-set, a connection request rejection message is returned and the origination edge module 408 selects another rotation. The right-hand side of FIG. 17 illustrates a second rotation of the route-set in which connection messages shown in arrays 1750A-1756B traverse the network as explained above.

Figure 18:
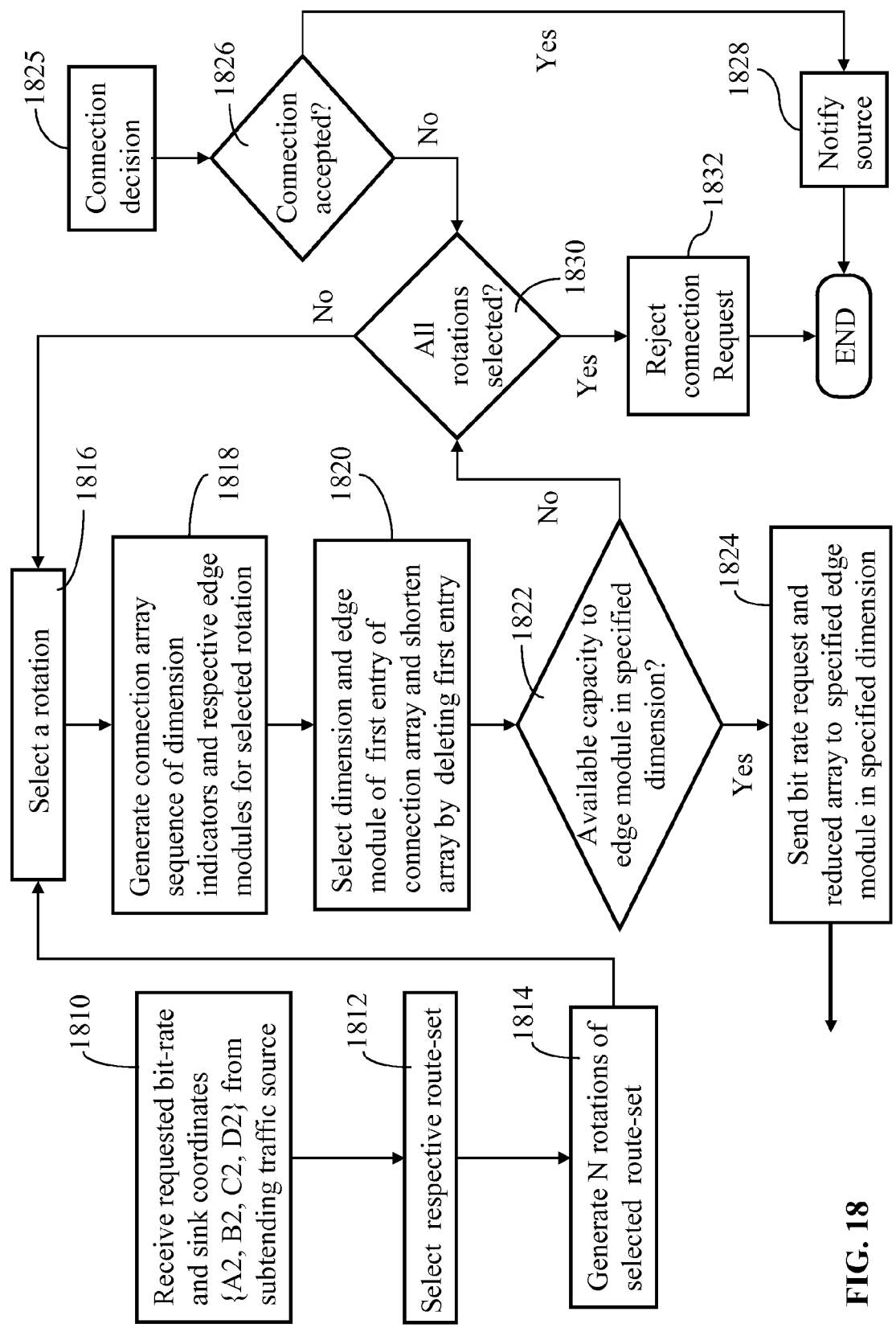
FIG. 18 is a flow diagram illustrating how connection requests are handled at an origination edge module in accordance with the invention.

FIG. 18 is a flow chart that shows the principal steps of a connection setup procedure executed by the edge modules 408 on receipt of a connection request from a source node (not shown). In step 1810, the edge module 408 receives the requested bit-rate and coordinates (e.g., A2, B2, C2, D2) of a terminating edge module 408 that serves the intended sink. As will be understood by those skilled in the art, the coordinates of the termination edge module 408 that serves the sink identified in the connection setup request may not be known to the subtending source. If so, the originating edge module 408 may perform any one of a number of translation procedures to determine the coordinates of the terminating edge module. In step 1812, the originating edge module selects a route-set using the coordinates of the terminating edge module. The originating edge module thereafter generates the N rotations of the selected route-set (step 1814) and selects a first rotation (step 1816). The first route-set rotation and the coordinates of the terminating edge module are used to generate a connection array (step 1818). The dimension identifier and the edge module identifier in the first record of the connection array are used to determine a first hop destination for a connection request message. Before the request message is formulated and forwarded to the first hop destination, the first record is deleted from the connection array (step 1820) as explained above with reference to FIG. 17. The available capacity to the first edge module in the specified dimension is checked in step 1822. If capacity is available to the first hop edge module, a connection request message is formulated (step 1824) and forwarded to the first hop edge module in the specified dimension. In step 1825, the origination edge module places the connection request in a queue and waits for a confirmation of request acceptance or denial. If the request is accepted, the source node is notified in step 1828 and the procedure ends. Otherwise, the origination edge module determines whether all rotations have been tried (step 1830) and, if not, a next rotation is selected (step 1816), and the process of steps 1818-1824 are repeated. Likewise if it is determined in step 1822 that adequate capacity is not available to the first hop edge module in the specified dimension, a determination is made in step 1830 as to whether all rotations have been attempted. If not, the process returns to step 1816 and steps 1818-1822 are repeated. If, however, all rotations have been selected, the connection request is rejected in step 1832 and the process ends.

The process of selecting rotations for routing is preferably based on a scheme that will tend to balance loads on the respective routes. A round-robin method of selection may therefore be used. Some other distribution method that attempts to equalize the capacity allocations to the mutually-exclusive routes of a route-set may also be used.

Figure 19:
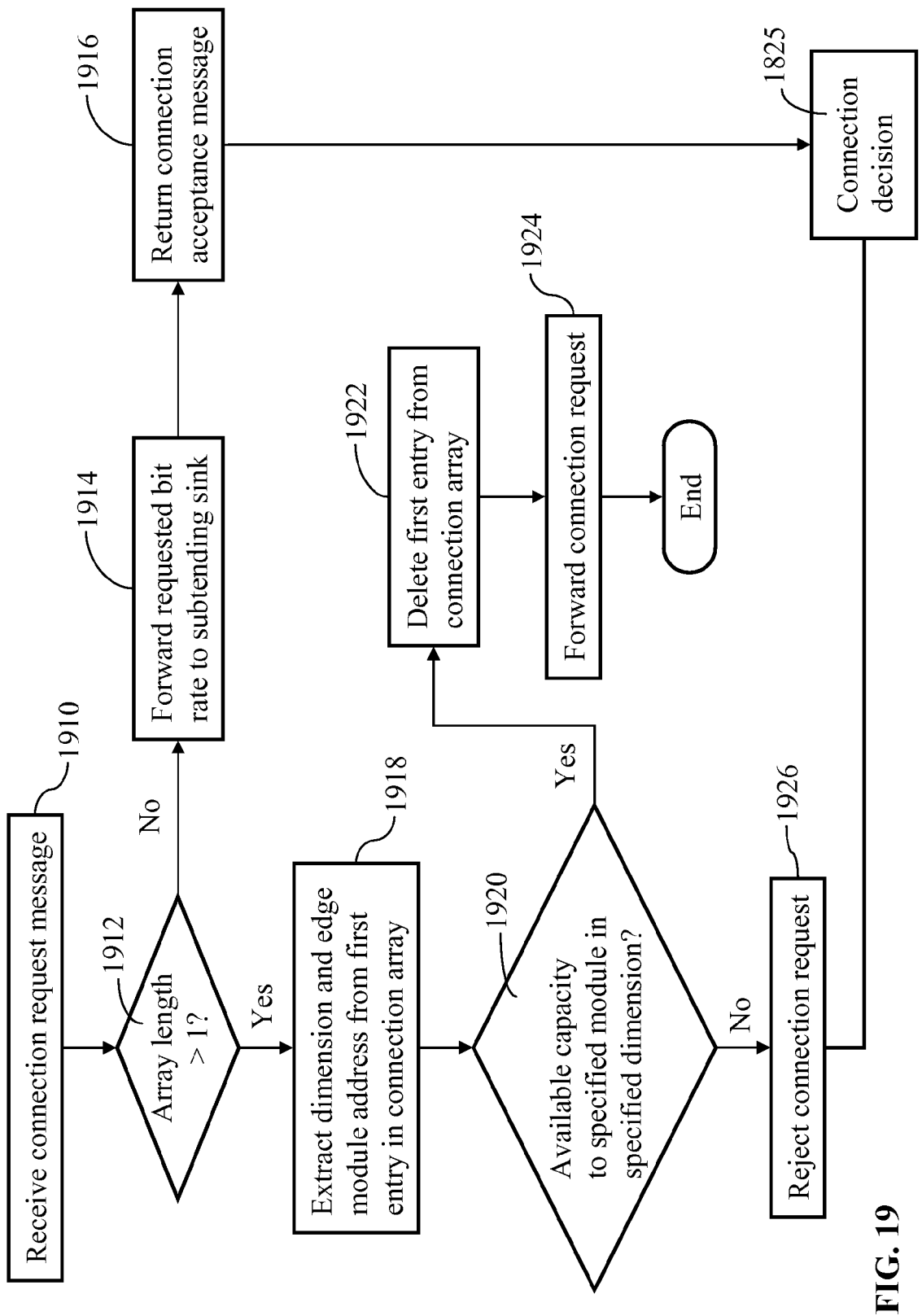
FIG. 19 is a flow diagram illustrating how connection requests are handled at a terminating edge module or an edge module serving as a tandem switch in accordance with the invention.

FIG. 19 is a flow diagram showing the principal steps in the connection setup process performed by edge modules downstream of an originating edge module 408. In accordance with the procedure, a connection request message is received in step 1910. In step 1912, the length of the routing array received in the message is examined to determine whether the routing array is longer than one record. If not, downstream edge module 408 is the terminating edge module and the requested bit-rate is forwarded to a subtending sink in step 1914. Thereafter, a connection acceptance message is formulated and returned to the originating edge module in step 1916 and the procedure ends. If the length of the routing array is greater than one record, the downstream edge module is not the terminating edge module. The process therefore continues in step 1918 in which the downstream edge module 408 extracts the dimension identifier from the first record of the routing array and the coordinates of the next edge module and determines whether capacity is available to the specified edge module in step 1920. If the capacity is available, the downstream edge module deletes the first record from the connection array (step 1922) and forwards the connection request (step 1924) to the next downstream edge module. A connection array length indicator may be inserted before the message is forwarded, as explained above. If it is determined in step 1920 that the required capacity is not available to the next downstream edge module, the connection request is rejected in step 1926 by sending a connection rejection message back (step 1825, FIG. 18) to the originating edge module using any one of a number of protocols well known in the art.

The invention therefore provides a highly-efficient network that can be expanded to provide a global data network. The N-dimensional lattice network in accordance with the invention is an adaptive, robust network of autonomous edge modules that effect connection setup with a minimum of delay and signaling overhead. The N-dimensional lattice network in accordance with the invention employs a simple addressing scheme that enables the coordinates of an edge module, in combination with a dimension identifier array, to be used as a routing map for enabling connection setup. The requirement for extensive translation tables and complex route-sets is therefore eliminated. Consequently, the N-dimensional lattice network operates with exceptional efficiency.

The embodiment(s) of the invention described above is(are) intended to be exemplary only. The scope of the invention is therefore intended to be limited solely by the scope of the appended claims.

I claim:
1. A lattice network comprising:
 a plurality of edge modules arranged into:
  a group of non-intersecting primary sub-nets, each primary subnet having a first number of edge modules;
  a group of non-intersecting secondary sub-nets, each secondary sub-net having a second number of edge modules; and
  a group of non-intersecting ternary sub-nets, each ternary-subnet having a third number of edge modules; and
 a plurality of core modules arranged into:
  a group of primary core stages, each primary core stage exclusively assigned to a respective primary sub-net and having a number of primary core modules, each said primary core module connecting to each edge module of said respective primary sub-net;
  a group of secondary core stages, each secondary core stage exclusively assigned to a respective secondary sub-net and having a number of secondary core modules, each said secondary core module connecting to each edge module of said respective secondary sub-net; and
  a group of ternary core stages, each ternary core stage exclusively assigned to a respective ternary sub-net and having a number of ternary core modules, each said ternary core module connecting to each edge module of said respective ternary sub-net;
 wherein each edge module belongs to only one of said primary sub-nets, only one of said secondary sub-nets, and only one of said ternary sub-nets.

2. The lattice network of claim 1 wherein each of said first number of edge modules, said second number of edge modules, and said third number of edge modules is within the range of 8 to 256.

3. The lattice network of claim 1 wherein a target capacity C, expressed in bits per second, is realized by selecting said first number of edge modules, said second number of edge modules, and said third number of edge modules, denoted $Q_1$, $Q_2$, and $Q_3$, respectively, so that:

$$C = R \times m_0 \times (Q_1 \times Q_2 \times Q_3),$$

$m_0$ being a number of dual links per edge module where a dual link comprises an input link and an output link, and R being a capacity, in bits per second, of each of said links.

4. The lattice network of claim 1 wherein at least one core stage comprises at least one data packet switch.

5. The lattice network of claim 1 wherein the core stage of at least one of said sub-nets comprises at least one cross connector.

6. The lattice network of claim 1 wherein the core stage of at least one of said sub-nets comprises a plurality of core switch modules.

7. The lattice network of claim 6 wherein said core switch modules are geographically distributed.

8. The lattice network of claim 6 wherein at least one of said core switch modules is a time-division-multiplexed space switch.

9. The lattice network of claim 6 wherein at least one of said core switch modules is an optical switch.

10. A network comprising:
   a plurality of core modules arranged into core stages, each core stage comprising a number of core modules;
   a plurality of edge modules arranged into a plurality of sub-nets, each sub-net having an integer number, Q, of edge modules, the sub-nets having a one-to-one correspondence to the core stages so that each sub-net is coupled to a corresponding core stage, and all edge modules of a sub-net coupled to a given core stage are interconnected through each core module of the given core stage;
   wherein any two sub-nets from among the plurality of sub-nets have at most one edge module in common;
   wherein each edge module of the plurality of edge modules is common in a predefined number, N, of corresponding sub-nets from among the plurality of sub-nets;
   wherein the predefined number, N, is specific to the network and is selected to be an integer between two and five;
   wherein each edge module has a plurality of dual ports, and the plurality of dual ports of a specific edge module common to N specific sub-nets are divided into N port groups each connecting to a respective core stage corresponding to one of the N specific sub-nets and a port group connecting to local sources and sinks wherein the plurality of sub-net are arranged into N groups of sub-nets;
   wherein any two sub-nets within any group of sub-nets from among the N groups of sub-nets are non-intersecting having no edge module in common; and
   wherein each sub-net within any group of sub-nets from among the N groups of sub-nets intersects a number of sub-nets belonging to each other group of sub-nets.

11. The network of claim 10 wherein said each edge module is identified by coordinates, each coordinate associated with one of the N groups of sub-nets.

12. The network of claim 11 wherein said each edge module determines its routes to each destination edge module, from among the plurality of edge modules, solely from coordinates of said each destination edge module.

13. The network of claim 10 wherein at least one core module, from among the plurality of core modules, is an optical switch.

14. The network of claim 10 wherein a route from any edge module belonging to a given sub-net to any other edge module belonging to the given sub-net traverses only one core module belonging to a core stage corresponding to the given sub-net.

15. The network of claim 10 wherein the core modules of the plurality of core modules are not connected to each other.

16. The network of claim 10 wherein each of the edge modules receives a request for a connection to a destination edge module belonging to said plurality of edge modules and generates a plurality of routes to said destination edge module.

17. The network of claim 16 wherein said plurality of routes includes mutually exclusive routes traversing different core modules.

18. In a network comprising a plurality of edge modules and a plurality of core modules, the core modules arranged into a predefined number N, $2 \leq N \leq 5$, of core groups, each core module in core group j, $1 \leq j \leq N$, connecting to a number $Q_j$ of edge modules, the number $Q_j$ being specific to core group j, $2 < Q_j \leq 256$, and each edge module connecting to one core module in each of the N core groups and uniquely identified by N coordinates associated with the N core groups where a $j_{th}$ coordinate, $1 \leq j \leq N$, takes a value between 0 and $(Q_j - 1)$, a method of setting-up a connection from a first edge module to a second edge module, the method comprising steps of:
   formulating at the first edge module a first path identified by a first routing array having N records, each record corresponding to an edge module along the first path and storing a coordinate identifier and a coordinate value, the coordinate identifier indicating a subsequent core group and the coordinate value indicating a subsequent edge module connecting to a core module of the subsequent core group;
   setting the first edge module as a current edge module;
   determining coordinates of a subsequent edge module according to a coordinate identifier and a coordinate value indicated in a first record of the first routing array;
   deleting the first record of the first routing array;
   forwarding the first routing array from the current edge module to the subsequent edge module; and
   setting the subsequent edge module as the current edge module with current coordinates equal to coordinates of the subsequent edge module.

19. The method of claim 18 further comprising repeating the steps of determining, deleting, and forwarding until a last record of the first routing array is deleted.

20. The method of claim 19 further comprising:
   specifying a bit-rate requirement for the connection; and
   abandoning the first path subject to unavailability of sufficient free capacity on a link of the first path to support the bit-rate requirement.

21. The method of claim 20 further comprising steps of:
   formulating at the first edge module a second path identified by a second routing array having N entries, each entry corresponding to an edge module along the second path and storing a coordinate identifier and a coordinate value, the coordinate identifier indicating a subsequent core group and the coordinate value indicating a subsequent edge module connecting to a core module of the subsequent core group;
   setting the first edge module as a current edge module;
   determining coordinates of a subsequent edge module according to a coordinate identifier and a coordinate value indicated in a first entry in the second routing array;
   deleting the first entry of the second routing array;
   forwarding the second routing array from the current edge module to the subsequent edge module; and setting the subsequent edge module as the current edge module with current coordinates equal to coordinates of the subsequent edge module.

22. The method of claim 21 wherein the first path and the second path are mutually exclusive traversing different core modules.

23. In a network comprising a plurality of edge modules and a plurality of core modules, the core modules arranged into a predefined number N, N=4, of core groups, each core module in core group j, $1 \leq j \leq N$, connecting to a number $Q_j$ of edge modules, the number $Q_j$ being specific to core group j, $2 < Q_j \leq 256$, and each edge module uniquely identified by N coordinates where a $j^{th}$ coordinate, $1 \leq j \leq N$, takes a value between 0 and $(Q_j-1)$, a first edge module, from among the plurality of edge modules, the first edge module:

identifies the core groups by N identifiers A, B, C, and D;

permutes (N−1) identifiers B, C, D, to produce factorial (N−1) route-set generating permutations ABCD, ABDC, ACBD, ACDB, ADBC, and ADCB;

generates N rotations of each route-set generating permutation, each rotation defining N mutually-exclusive routes traversing different core modules, the N rotations of permutations of ABCD, ABDC, ACBD, ACDB, ADBC, and ADCB, respectively, being:
ABCD, BCDA, CDAB, and DABC,
ABDC, BDCA, DCAB, and CABD,
ACBD, CBDA, BDAC, and DACB,
ACDB, CDBA, DBAC, and BACD,
ADBC, DBCA, BCAD, and CADB, and
ADCB, DCBA, CBAD, and BADC;
and selects N rotations of one of the factorial (N−1) route-set generating permutations to define N mutually exclusive routes from the first edge module to a destination edge module from among the plurality of edge modules according to N coordinates of the destination edge module.

24. A network comprising:

a plurality of edge modules arranged into a number $Q_1$ of columns and a number $Q_2$ of rows, each column having $Q_2$ edge modules and each row having $Q_1$ edge modules;

a number $Q_2$ of primary core modules having a one-to-one correspondence to the $Q_2$ rows, each primary core module interconnecting $Q_1$ edge modules of one of the $Q_2$ rows; and a number $Q_1$ of secondary core modules having a one-to-one correspondence to the $Q_1$ columns, each secondary core module interconnecting $Q_2$ edge modules of one of the $Q_1$ columns;

wherein the number $Q_1$ is between 8 and 256 and the number $Q_2$ is between 8 and 256 wherein each edge module has at least one link from data sources and at least one link to data sinks;

wherein a path from an edge module in a specific row to another edge module in the specific row traverses a primary core module corresponding to the specific row;

wherein a path from an edge module in a specific column to another edge module in the specific column traverses a secondary core module corresponding to the specific column;

wherein a first path from a first edge module, in a first row and a first column, to a second edge module, in a different row and a different column, traverses a primary core module corresponding to the first row and a secondary core module corresponding to the second column; and wherein a second path from the first edge module to the second edge module traverses a secondary core module corresponding to the first column and a primary core module corresponding to the second row.

25. The network of claim 24 wherein each of the primary core modules is a switching module.

* * * * *